United States Patent
Rotem et al.

(10) Patent No.: US 10,509,917 B2
(45) Date of Patent: *Dec. 17, 2019

(54) CLOUD SECURITY PLATFORM

(71) Applicant: Avanan Inc., Great Neck, NY (US)

(72) Inventors: Roy Rotem, Tel Aviv (IL); Gil Friedrich, Great Neck, NY (US); Avraham Zelovich, Tel Aviv (IL)

(73) Assignee: Avanan Inc., Great Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,569

(22) Filed: Aug. 22, 2017

(65) Prior Publication Data

US 2017/0351875 A1    Dec. 7, 2017

Related U.S. Application Data

(63) Continuation of application No. 15/366,061, filed on Dec. 1, 2016, now Pat. No. 10,372,931.

(Continued)

(51) Int. Cl.
*G06F 17/00*        (2019.01)
*H04L 29/06*        (2006.01)
(Continued)

(52) U.S. Cl.
CPC ........ *G06F 21/6218* (2013.01); *G06F 21/606* (2013.01); *H04L 63/0227* (2013.01); *H04L 63/1441* (2013.01); *H04L 63/20* (2013.01)

(58) Field of Classification Search
CPC .. G06F 21/6218; H04L 63/1441; H04L 63/20
See application file for complete search history.

(56) References Cited

U.S. PATENT DOCUMENTS

| 7,908,658 B1 * | 3/2011 | Oeij ................ H04L 63/1425 709/206 |
| 8,392,357 B1 | 3/2013 | Zou et al. |

(Continued)

OTHER PUBLICATIONS

Tombstone Programming, https://en.wikipedia.org/wiki/Tombstone_(programming).

*Primary Examiner* — Mahfuzur Rahman
*Assistant Examiner* — Darshan I Dhruv
(74) *Attorney, Agent, or Firm* — Soquel Group I.P Ltd.

(57) ABSTRACT

A data security system, including a security manager computer making network API calls to a service that performs data-exchange transactions for end users, the API calls remotely controlling the service so that the security manager computer accesses an outgoing transaction that has already entered the cloud-based service, by generating one or more security platform rules that are applied by the service and cause the service to automatically transmit the outgoing transaction to an inspection location prior to transmission of the outgoing transaction to a destination, and a data inspector operative to inspect data of the outgoing transaction in the inspection location for data leakage, wherein the security manager computer further controls the service so as to transmit the outgoing transaction to the destinations when the data inspector clears the data, and to perform a remedial action regarding the outgoing transaction when the data inspector does not clear the data.

18 Claims, 26 Drawing Sheets

Related U.S. Application Data

(60) Provisional application No. 62/271,234, filed on Dec. 27, 2015.

(51) Int. Cl.
*G06F 21/62* (2013.01)
*G06F 21/60* (2013.01)

(56) References Cited

U.S. PATENT DOCUMENTS

| | | | |
|---|---|---|---|
| 9,118,685 B1* | 8/2015 | Brocco | H04L 63/102 |
| 9,165,142 B1* | 10/2015 | Sanders | G06F 21/566 |
| 9,716,724 B1* | 7/2017 | Chennuru | H04L 63/1433 |
| 2003/0158905 A1* | 8/2003 | Petry | H04L 51/12 |
| | | | 709/206 |
| 2007/0143407 A1 | 6/2007 | Avritch et al. | |
| 2008/0282338 A1* | 11/2008 | Beer | G06F 21/566 |
| | | | 726/12 |
| 2010/0125903 A1 | 5/2010 | Devarajan et al. | |
| 2010/0318605 A1 | 12/2010 | Weis | |
| 2011/0125853 A1 | 5/2011 | Weber | |
| 2012/0240183 A1* | 9/2012 | Sinha | H04W 12/08 |
| | | | 726/1 |
| 2012/0255010 A1* | 10/2012 | Sallam | G06F 21/572 |
| | | | 726/24 |
| 2013/0007152 A1 | 1/2013 | Alspector et al. | |
| 2013/0254260 A1 | 9/2013 | Stevens et al. | |
| 2014/0020047 A1* | 1/2014 | Liebmann | H04L 63/20 |
| | | | 726/1 |
| 2014/0123279 A1* | 5/2014 | Bishop | H04L 63/1491 |
| | | | 726/23 |
| 2014/0155028 A1 | 6/2014 | Daniela et al. | |
| 2014/0208426 A1* | 7/2014 | Natarajan | H04L 63/1416 |
| | | | 726/23 |
| 2014/0280479 A1 | 9/2014 | Kazerani et al. | |
| 2015/0082197 A1 | 3/2015 | Pearl et al. | |
| 2016/0036816 A1* | 2/2016 | Srinivasan | H04L 63/10 |
| | | | 726/1 |
| 2016/0048683 A1 | 2/2016 | Sanders et al. | |
| 2016/0275303 A1* | 9/2016 | Narayanaswamy | |
| | | | G06F 21/6218 |
| 2017/0078314 A1* | 3/2017 | Mohanty | H04L 63/1425 |
| 2017/0093888 A1* | 3/2017 | Marzorati | G06F 21/554 |
| 2017/0118239 A1* | 4/2017 | Most | H04L 63/1433 |

* cited by examiner

FIG. 7

MAIN DASHBOARD

| Alerts by Severity | | |
|---|---|---|
| SaaS | | Users |
| Total | | 2% |
| ▨ Box - Internal Users | | 7 |
| ⬤ Dropbox - Internal Users | | 0 |

| All Files | Incoming Files | Outgoing Files |
|---|---|---|
| 50,820 | 19,081 | 523 |

| Uploads in the Last 24 hours | Download in the Last 24 hours | Active Users |
|---|---|---|
| 1    0% | 107    0% | 12 |

Malicious

Incoming  6261
Outgoing  365

DLP

All  1066
    445

Alerts

| Date/Time | Description | Severity |
|---|---|---|
| 2016-10-12 00:00 | CC Number - Amazon (Symantec) | ▨ |
| 2016-10-12 00:00 | US Social Security Numbers - Egn... | ▨ |
| 2016-10-12 00:00 | American Express Number - Egny... | ▨ |
| 2016-10-12 00:00 | American Express Number - Egny... | ▨ |
| 2016-10-12 00:00 | Password Files - Egnyte - Outgoin... | ▨ |
| 2016-10-12 00:00 | High Severity - Egnyte Outgoing | ▨ |
| 2016-10-12 00:00 | Egnyte CheckPoint AV Outgoing | ▨ |
| 2016-10-12 00:00 | Egnyte CheckPoint AV Outgoing | ▨ |

Malicious Findings

DLP Findings

Cloud Security Platform
Search
Dashboard
Analytics
Alerts
Reports
Security Stack
Configuration
Cloud App Store
Security App Store
User Management
Smart Search
Quarantine

FIG. 14

ANALYTICS

| ☐ SaaS | Entity Type | Name | Matched | Severity | Status | Scheduled Export | Security App.. | Actions |
|---|---|---|---|---|---|---|---|---|
| ☐ box | File | Box - Drivers License.. | 2 | ▨ | Running | None | ☐ | |
| ☐ ◬ | File | CC Numbers Shared Ex.. | 34 | ▨ | Running | None | ☐ | |
| ☐ box | File | Company Confidential.. | 44 | ▨ | Running | None | ☐ | |
| ☐ ⊛ | Dropbox File | Company Confidential.. | 8 | ▨ | Running | None | ☐ | |
| ☐ ▣ | Google Mail Att.. | Company Confidential.. | 2 | ▨ | Running | None | ☐ | |
| ☐ ▣ | Google Mail Mes.. | Company Confidential.. | 0 | ▨ | Running | None | ☐ | |
| ☐ ▣ | Google Mail Mes.. | Company Confidential.. | 16 | ▨ | Running | None | ☐ | |
| ☐ ◬ | File | Company Confidential.. | 31 | ▨ | Running | None | ☐ | |
| ☐ ▣ | Attachment | Company Confidential.. | 11 | ▨ | Running | None | ☐ | |
| ☐ ▣ | Email Message | Company Confidential.. | 2 | ▨ | Running | None | ☐ | |
| ☐ ▣ | Office File | Company Confidential.. | 20 | ▨ | Running | None | ☐ | |
| ☐ ◬ | File | Google All Files Test | 215 | ▨ | Running | None | ☐ | |

Cloud Security Platform — Dashboard, Analytics, Alerts, Reports, Security Stack, Configuration, Cloud App Store, Security App Store, User Management, Smart Search, Quarantine Queries — Filter by.. — Actions — Add New Query — Import A Query

CLOUD SECURITY PLATFORM

PRIORITY REFERENCE TO RELATED APPLICATIONS

This application is a continuation of U.S. patent application Ser. No. 15/366,061 entitled CLOUD SECURITY PLATFORM, and filed on Dec. 1, 2016 by inventors Roy Rotem, Gil Friedrich and Avraham Zelovich. U.S. patent application Ser. No. 15/366,061 is a non-provisional of U.S. Provisional Application No. 62/271,234, entitled NON-IN-LINE METHOD FOR BLOCK-AND-INSPECT BY REVOCATION-RESTORATION SYSTEM, and filed on Dec. 27, 2015 by inventors Roy Rotem, Gil Friedrich and Avraham Zelovich. The contents of these applications are hereby incorporated herein by reference in their entirety.

FIELD OF THE INVENTION

The present invention relates to data security for cloud-based services.

BACKGROUND OF THE INVENTION

In today's work environment a major part of data communication is done over computer networks. Data needs to be inspected for presence of malware, and for presence of sensitive data. Often, the inspection process is not immediate and is resource-intensive, yet the receiver desires to prevent access to the data until the inspection completes and the data is allowed to continue its regular course.

Common examples of inspection of data include:
- e-mail systems must check that all incoming file-attachments are safe from computer viruses, phishing schemes or other malware;
- file sharing systems must check that files are clean from malicious content before being accessed or being shared with other parties;
- messaging/collaboration systems must ensure that data flowing between entities does not leak sensitive information;
- systems that share sensitive-data often need to encrypt that data upon send and arrival.

Reference is made to FIG. 1, which is a simplified block diagram of a prior art security system, in accordance with an embodiment of the present invention. FIG. 1 shows an enterprise data center 100 that provides various data exchange services to enterprise employees. The data exchange services include a collaborative document management service 220, such as the MICROSOFT EXCHANGE SERVER® service developed by Microsoft Corporation of Redmond, Wash., USA, and a file sharing service 230, such as the DOCUMENTUM® service developed by EMC Corporation of Hopkinton, Mass., USA. Employees 110A, 110B and 110C access these services using any of a variety of devices, including inter alia a smartphone, a laptop computer and a desktop computer. Also shown in FIG. 1 is a firewall 150 which scans incoming and outgoing data for malware and for leakage of sensitive data.

Firewall 150 scans incoming data before the receiver has access to that data, using proxy technologies that often perform block-and-inspect. Specifically, network traffic between a sender and a receiver must flow through firewall 150, which inspects data and, if the data is cleared, forwards the data to the receiver. Firewall 150 is often a store-and-forward device, which blocks the flow of the traffic until inspection completes. Other store-and-forward devices include mail-relay, routers, proxy-servers, software agents and other inspection modules. This type of inspection is referred to as being inline. Inline inspection techniques are described at https://en.wikipedia.org/wiki/Deep_packet_inspection.

Conventional inline block-and-inspect techniques suffer from several drawbacks, including:
- Inline systems cannot fully support a fail-open mode, and introduce an additional point-of-failure to services 120 and 130.
- Block-and-inspect introduces additional latency, during which traffic is re-routed to an inline device and then back to services 120 and 130.
- Introduction of inspection entities into a network disrupts normal operation of other components of services 120 and 130. For example, an added email mail transport agent adversely impacts anti-spam filters used by an e-mail server, because an original source IP address is no longer visible.
- Traffic that is encrypted cannot be inspected easily by inline systems.
- Inline systems increase network-latency, and negatively impact the end user experience.

Even worse, in today's off-site environments such as cloud/SaaS services, firewall 150 cannot inspect traffic, because traffic often flows over a public-network to computing and storage systems that the enterprise does not own or control. Moreover, today's end users may access these services from any location, not only from an enterprise office. Some enterprises try to force traffic through a proxy to ensure that the traffic undergoes inspection, but this leads to difficulties of managing endpoint proxy configurations, and of overcoming network-topology limitations.

Reference is made to FIG. 2, which is a simplified block diagram of a prior art data security system that gets bypassed by end users of cloud applications. Shown in FIG. 2 are enterprise data center 100 and firewall 150, and a variety of cloud-based data-exchange services that run in a cloud computing center 200, the services including a collaborative document management service 220, such as the OFFICE 365® service developed by Microsoft Corporation of Redmond, Wash., a file sharing service 230, such as the BOX-.NET® service developed by Box.net, Inc. of Palo Alto, Calif., and an e-mail service 240, such as the GMAIL® service developed by Google Inc. of Mountain View, Calif. End users 210A, 210B and 210C access these services, bypassing firewall 150, using any of a variety of devices, including inter alia a smartphone, a laptop computer and a desktop computer.

An enterprise's sensitive files are now in the enterprise cloud, and may be shared with external users; and malicious files may be enter or reside in the enterprise cloud. An enterprise, in fact any business, large or small, and even an individual using cloud services, requires protection against malware, against advanced persistent threats, against anomalies, against insider threats and against data leakage. An enterprise may require data sanitation, endpoint compliance, share policy management, security information and event management (SIEM), ticketing integration, and audit compliance. Cloud service providers do not always offer such comprehensive protection and management, and such protection and management is not covered by service level agreements.

Because of these drawbacks enterprises must compromise between inline prevention systems and non-inline detection-only systems for which the system sends alerts but cannot block/prevent a security breach from occurring.

It would this be of advantage to provide a robust security system that provides the requisite security, yet overcomes these drawbacks of in-line block-and-inspect systems for today's cloud/SaaS environments.

SUMMARY

Embodiments of the present invention provide robust security systems that overcome drawbacks of conventional in-line block-and-inspect systems for today's cloud/SaaS environments. These systems are essential not only to large enterprises, but also to business, large and small, and to individuals who use cloud services.

Embodiments of the present invention provide non-inline prevention methods, which prevent end users from accessing data during an inspection phase until access is cleared, while not being inline. Because they are not inline, these embodiments overcome the drawbacks of existing inline systems. Because they block access to data until the data is cleared, these embodiments overcome drawbacks of detection-only systems.

Embodiments of the present invention use network application programming interfaces to remotely control cloud-based services, including inter alia e-mail, file-sharing, collaborative data processing services.

Embodiments of the present invention protect against malware and data leakage for both incoming and outgoing data transactions, such as inter alia a new file that is uploaded or downloaded or shared, or a new e-mail that arrives or is sent. The data transactions may be inter-enterprise communications, between employees of an enterprise, or may be communications to or from sources external to the enterprise.

There is thus provided in accordance with an embodiment of the present invention a data security system, including a security manager remotely controlling, via a network application programming interface, a cloud-based service that performs data-exchange transactions for end users, operative to cause the service to prevent end user access to incoming transactions so that the security manager accesses the incoming transactions prior to end users being able to access the incoming transactions, and a data inspector operative to inspect data of incoming transactions for security clearance by invoking one or more content scanners, wherein the security manager is further operative to cause the service to restore end user access to the incoming transactions, when the security inspector clears the data, and to cause the service to perform a remedial action vis-à-vis the incoming transactions, when the security inspector does not the data.

There is additionally provided in accordance with an embodiment of the present invention a method for data security, including remotely controlling, by a security processor via a network application programming interface, a cloud-based service that performs data-exchange transactions for end users, causing, by the security processor, the service to prevent end user access to incoming transactions, including controlling the service so that the security processor accesses incoming transactions prior to end users being able to access the incoming transactions, inspecting data of incoming transactions for security clearance by invoking one or more content scanners, when the inspecting clears the data, then causing, by the security processor, the service to restore end user access to the incoming transactions, and when the inspecting does not clear the data, causing, by the security processor, the service to perform a remedial action vis-à-vis the incoming transactions.

There is further provided in accordance with an embodiment of the present invention a data security system, including a security manager remotely controlling, via a network application programming interface, a service that performs data-exchange transactions for end users, operative to cause the service to prevent transmission of outgoing transactions so that the security manager accesses outgoing transactions prior to transmission of the outgoing transactions to their destinations, and a data inspector operative to inspect data of outgoing transactions for data leakage, wherein the security manager is further operative to cause the service to transmit the transactions to their destinations, when the security inspector clears the data, and to perform a remedial action vis-à-vis the outgoing transactions, when the security inspector does not clear the data.

There is yet further provided in accordance with an embodiment of the present invention a method for data security, including remotely controlling, by a security processor via a network application programming interface, a service that performs data-exchange transactions for end users, causing, by the security processor, the service to prevent transmission of outgoing transactions, including controlling the service so that the security processor accesses outgoing transactions prior to the service transmitting the outgoing transactions to their destinations, inspecting data of outgoing transactions for data leakage breach, when the inspecting does not discover a breach, then causing, by the security processor, the service to transmit the outgoing transactions to their destinations, and when the inspecting discovers a breach, causing, by the security processor, the service to perform a remedial action vis-à-vis the outgoing transactions.

BRIEF DESCRIPTION OF THE DRAWINGS

The present invention will be more fully understood and appreciated from the following detailed description, taken in conjunction with the drawings in which:

FIG. 7 is a screen shot of a security stack interface, showing a configuration of services and data inspectors, in accordance with an embodiment of the present invention;

FIG. 14 is a screen shot of a main dashboard displaying overall results for several cloud services, in accordance with an embodiment of the present invention;

FIG. 15 is a screen shot of an analytics interface for cloud services, in accordance with an embodiment of the present invention;

FIG. 16 is a screen shot of an alerts interface for cloud services, in accordance with an embodiment of the present invention;

For reference to the figures, the following index of elements and their numerals is provided. Similarly numbered elements represent elements of the same type, but they need not be identical elements.

| Table of elements in the figures | |
|---|---|
| Element | Description |
| 100 | enterprise |
| 110 | end users |
| 120 | Microsoft Office software service, enterprise-based |
| 130 | Box.net file sharing service, enterprise-based |
| 150 | firewall |
| 200 | cloud computing center |
| 210 | end users |
| 220 | Microsoft Office software service, cloud-based |
| 230 | Box.net file sharing service, cloud-based |
| 240 | Google e-mail service, cloud-based |
| 300 | cloud security platform |
| 310 | security manager |
| 320 | data inspector |

Elements numbered in the 1000's are operations of flow charts.

LIST OF APPENDICES

APPENDIX A is a listing with application programming interface (API) calls, for implementing an embodiment of the present invention.

DETAILED DESCRIPTION

In accordance with embodiments of the present invention, systems and methods are provided for non-inline security systems for cloud/SaaS computing environments.

Figure 1:
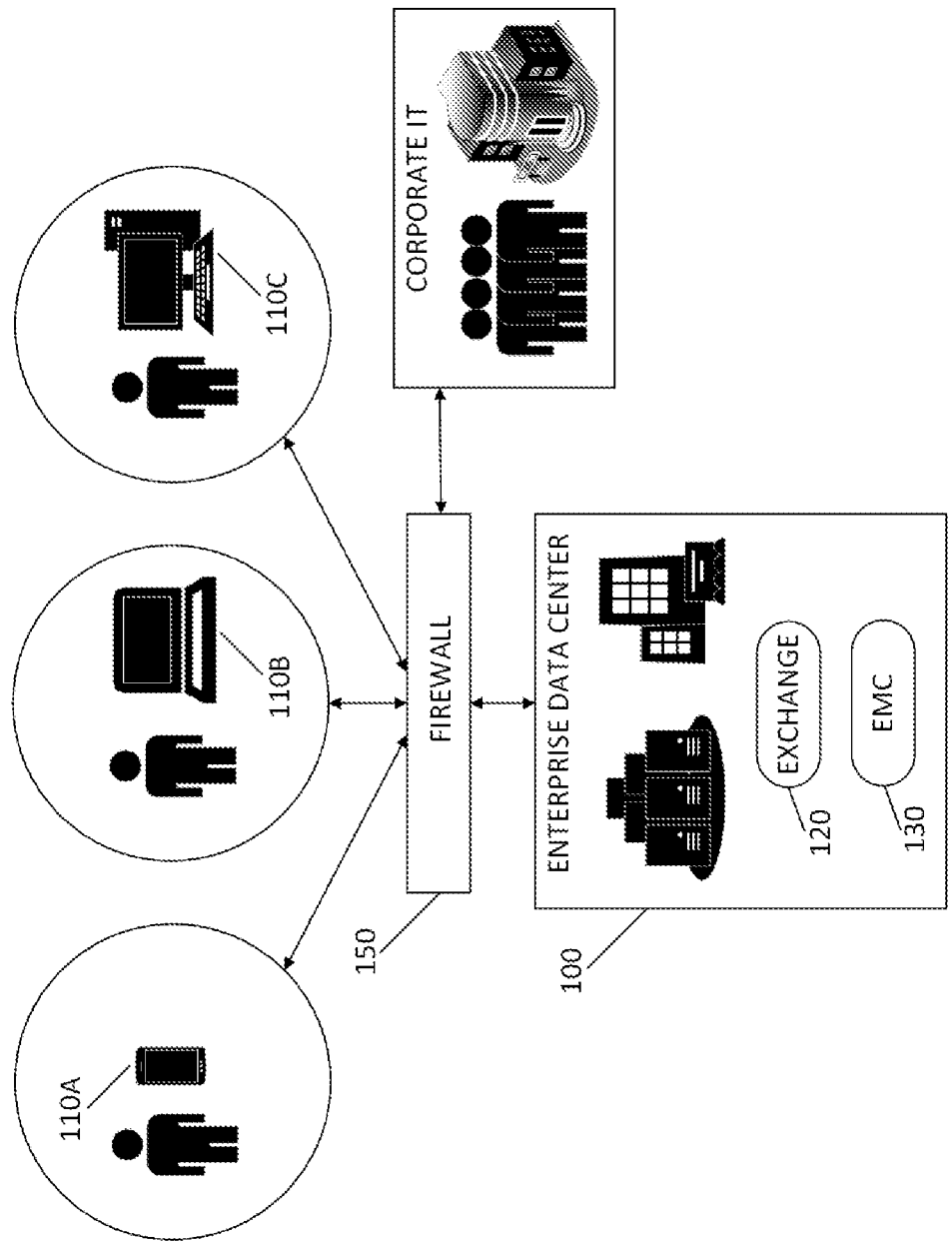
FIG. 1 is a simplified block diagram of a prior art data security system.
Figure 2:
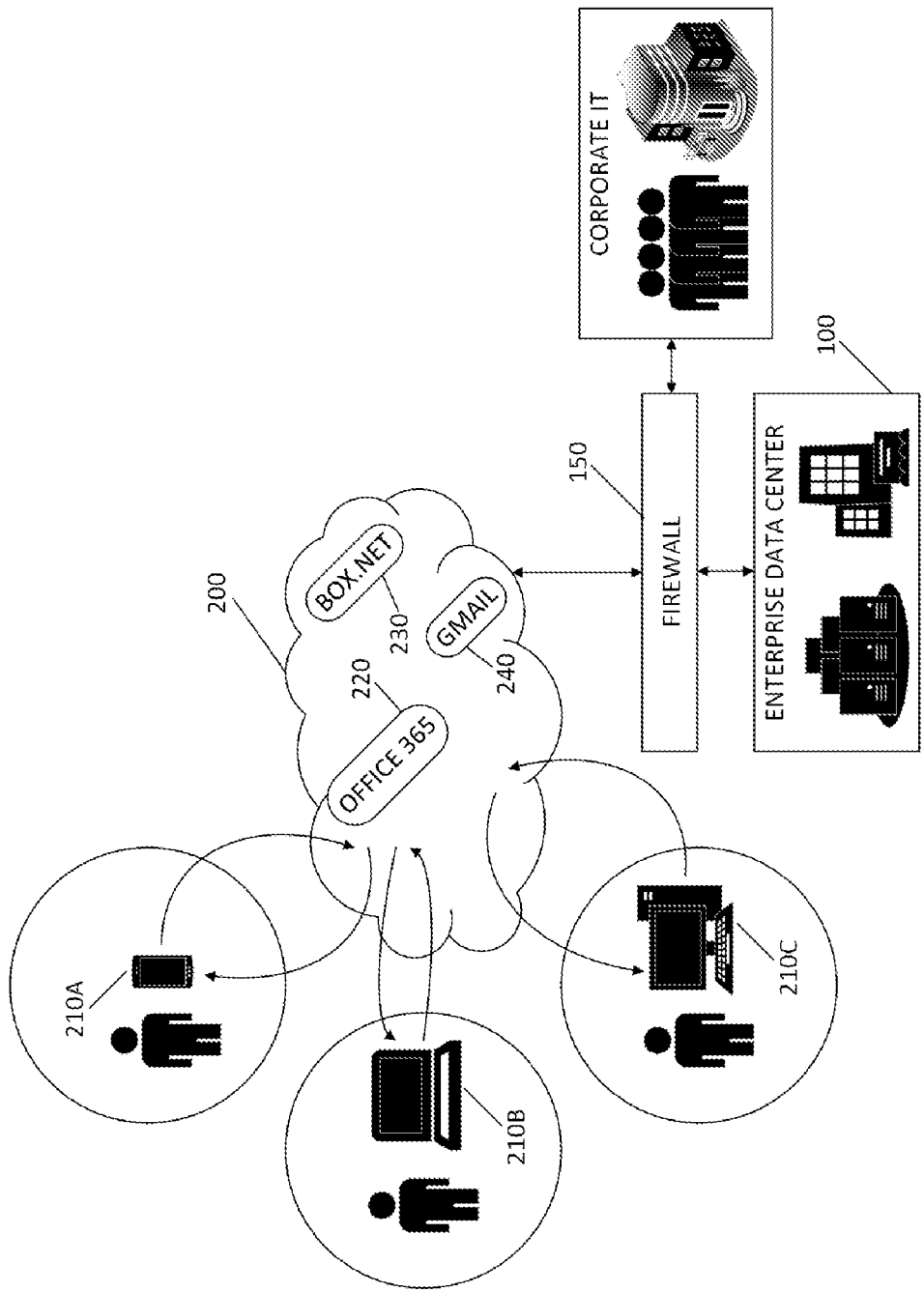
FIG. 2 is a simplified block diagram of a prior art data security system that gets bypassed by end users of cloud applications.
Figure 3:
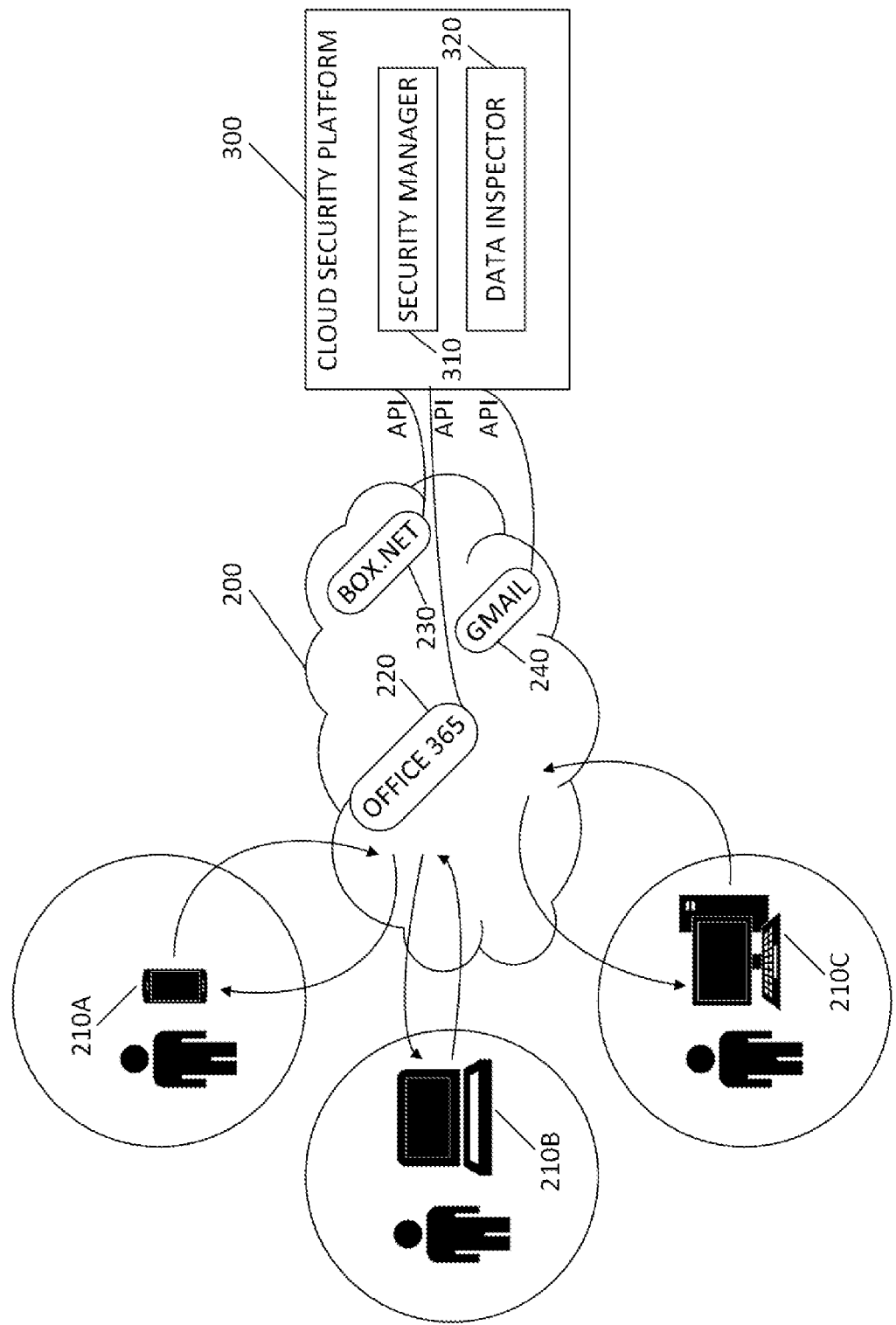
FIG. 3 is a simplified block diagram of a cloud security system for end users, in accordance with an embodiment of the present invention.

Reference is made to FIG. 3, which is a simplified block diagram of a cloud security system for end users, in accordance with an embodiment of the present invention. Shown in FIG. 3 are cloud-based data-exchange services that run in cloud computing center 200, the services including collaborative document management service 220, such as the OFFICE 365® service developed by Microsoft Corporation of Redmond, Wash., USA, file sharing service 230, such as the BOX.NET® service developed by Box.net, Inc. of Palo Alto, Calif., USA, and e-mail service 240, such as the GMAIL® service developed by Google Inc. of Mountain View, Calif., USA. End users 210A, 210B and 210C access these services using any of a variety of devices, including inter alia a smartphone, a laptop computer and a desktop computer.

Also shown in FIG. 3 is a cloud security platform 300, including a security manager 310 and a data inspector 320. Security manager 300 remotely accesses the various data-exchange services 220, 230 and 240 using their respective application programming interfaces (APIs). Security manager 300 may itself be a cloud-based system. Security manager 310 and data inspector 320 may or may not reside on the same computer or even within the same cloud. Data inspector 320 may be, for example, its own cloud service.

Security manager 310 and data inspector 320 include programmable data processing, storage and communication circuitry for performing the operations described below and with reference to the flowchart of FIG. 5.

Figure 4:
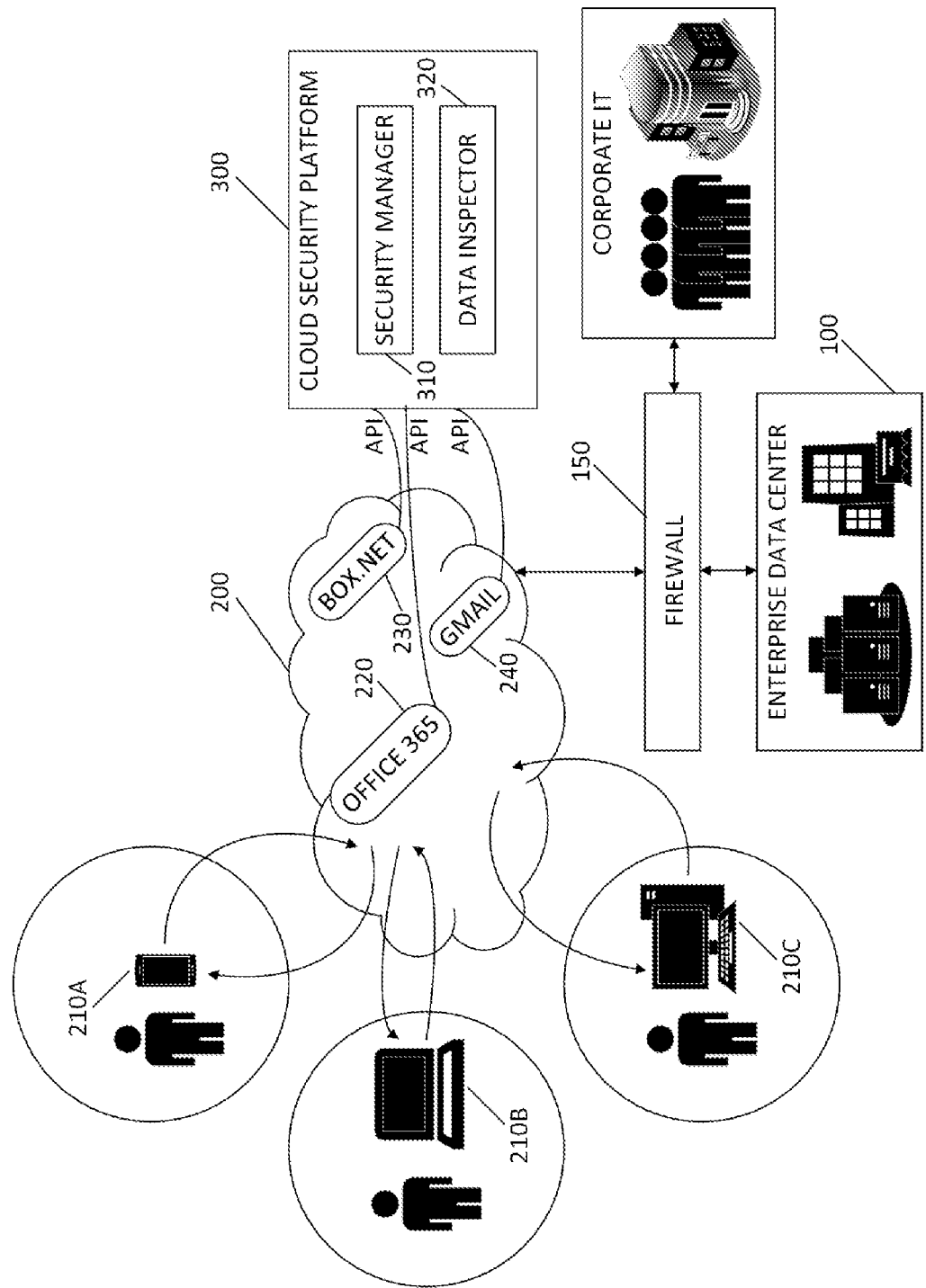
FIG. 4 is a simplified block diagram of a cloud security system for an enterprise, in accordance with an embodiment of the present invention.

Reference is made to FIG. 4, which is a simplified block diagram of a cloud security system for an enterprise 100, in accordance with an embodiment of the present invention. FIG. 4 shows enterprise data center 100 and firewall 150, cloud computing center 200 and cloud-based data-exchange services 220, 230 and 240. FIG. 4 also shows cloud security platform 300, including security manager 310 and data inspector 320.

Enterprise 100 generally has enterprise level subscriptions for its employees to data-exchange services 220, 230 and 240. Enterprise 100 itself uses a firewall 150 to access data-exchange services 220, 230 and 240. However, employees of enterprise 100, such as end users 210A, 210B and 210C may access these services from locations outside of enterprise 100, such as from their homes. Since these services are cloud-based, the enterprise has no direct control over them.

Figure 5:
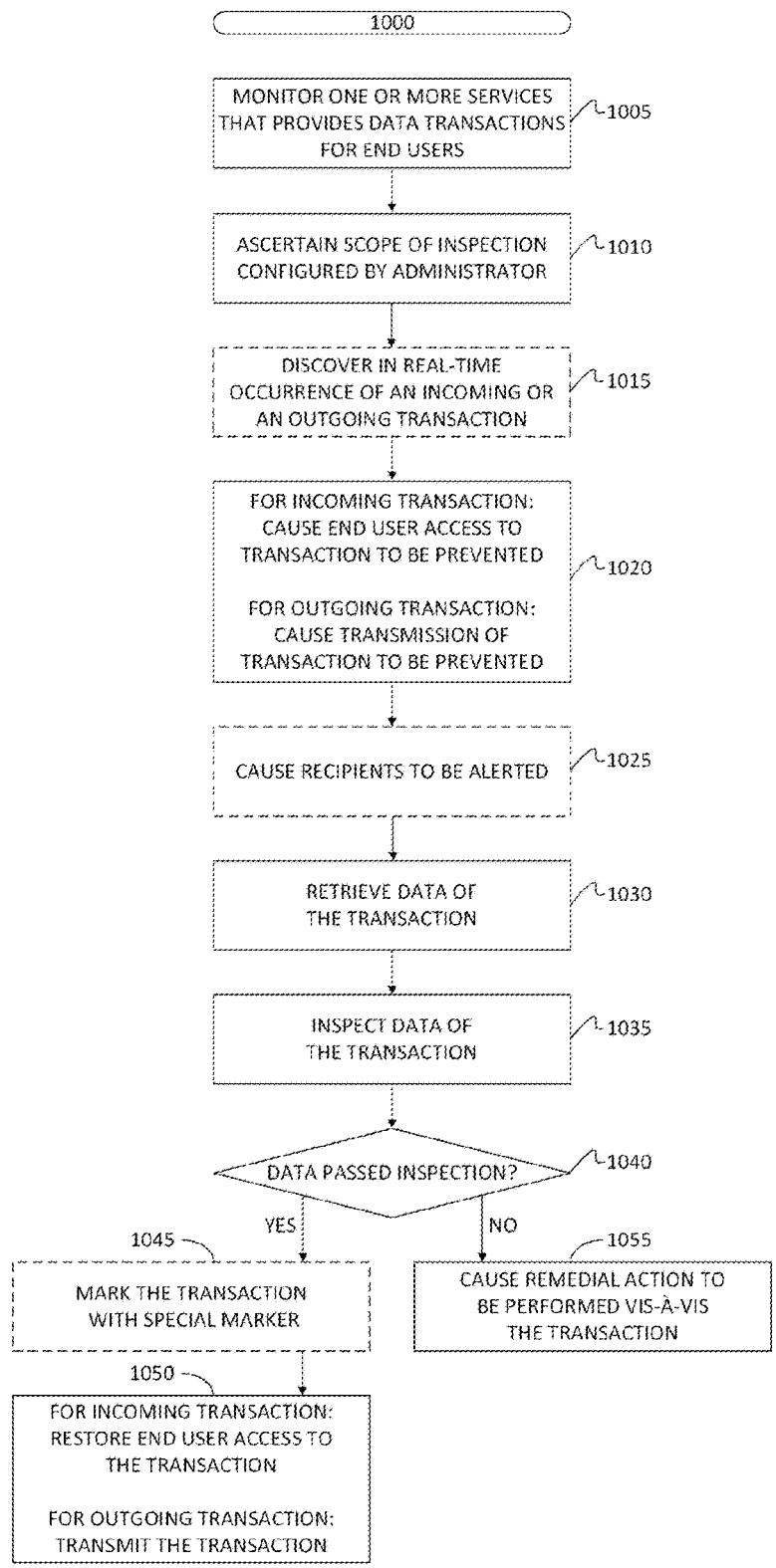
FIG. 5 is a simplified flowchart for a method for cloud security, in accordance with an embodiment of the present invention.

Reference is made to FIG. 5, which is a simplified flowchart for a method 1000 for cloud security, in accordance with an embodiment of the present invention. Method 1000 is practiced by security manager 310 and data inspector 320, to provide security for incoming and outgoing data transactions for services 220, 230 and 240. Many of the operations in FIG. 5 are performed via services 220, 230 and 240 themselves; namely, security manager 310 uses a network application programming interface (API) to control a service and thereby cause the service to perform various operations. Although method 1000 relates to both incoming and outgoing data transactions, it will be appreciated by those skilled in the art that separate methods may instead be used for incoming and outgoing data transactions.

Briefly, at operation 1005 security manager 310 monitors one or more data-exchange services, such as one or more of services 220, 230 and 240. At operation 1010, security manager 310 ascertains the scope of inspection configured by an administrator, as explained in detail hereinbelow. At operation 1015, security manager 310 optionally discovers in real-time occurrence of a new incoming or outgoing data transaction within the service, as explained in detail hereinbelow. Whether security manager 310 actively discovers the new data transaction at operation 1015, or instead relies on services 220, 230 to do so, at operation 1020 security manager 310 causes end-user access to the new transaction to be temporarily prevented, as explained in detail hereinbelow, if the new transaction is an incoming transaction, or causes transmission of the transaction to its destination to be temporarily prevented, if the new transaction is an outgoing transaction. Operation 1020 ensures that security manager 310 accesses data of the new transaction prior to end users and recipients being able to access that data. At operation 1025, security manager 310 optionally causes recipients to be alerted that the new transaction has been temporarily prevented. At operation 1030, security manger 310 retrieves the data of the new transaction. At operation 1035, data inspector 320 inspects the data of the new transaction, as explained in detail hereinbelow. At operation 1040 a determination is made as to whether or not the data of the new transaction passed the inspection of operation 1035. If so, then at operation 1045, security manager 310 optionally causes the new transaction to be marked with a special marker, indicating that the transaction passed inspection. At operation 1050, security manager 310 causes end user access to the new transaction to be restored, if the new transaction is an incoming transaction, or causes the new transaction to be transmitted to its destination, if the new transaction is an outgoing transaction. Otherwise, if the data of the new transaction did not pass inspection, then at operation 1055, security manager 310 causes a remedial action to be performed vis-à-vis the new transaction.

Operations of the flowchart of method 1000 are now described in detail.

Operation 1010

At operation 1010 security manager 310 ascertains the scope of inspection configured by an administrator. The administrator configures the inspection so as to be applied/not be applied to specific users, specific groups of users, or to the entire enterprise. The administrator also configures the inspection so as to be applied/not be applied to various types of files including inter alia e-mail attachments;
compressed files such as WINZIP® files;
editable documents such as Word documents, EXCEL® spreadsheets and POWERPOINT® presentations; and
multi-media content such as audio and video content.

Operation 1015 (Optional)

At optional operation 1015, security manager 310 discovers in real-time occurrence of a new data transaction within the one or more data-exchange services, such as inter alia a new file that is uploaded or downloaded or shared, or a new e-mail that arrives or is sent. The new data transaction may be an inter-enterprise communication, between employees of the enterprise, or a communication to or from a source external to the enterprise.

It will be appreciate by those skilled in the art that embodiments of the present invention have the advantage of being fail-safe; namely, if security manager 310 fails then the enterprise does not lose its access to services 220, 230 and 240.

Inter alia, operation 1015 may comprise, respectively, one or more of the following:

(i) services 220, 230 and 240 send an event notification to security manager 310;
(ii) services 220, 230 and 240 forward a message to security manager 310, when a data transaction occurs;
(iii) security manager 310 polls services 220, 230 and 240 for occurrence of data transactions.

In one embodiment of the present invention, polling is performed using a network API for the service.

Operations 1020 and 1050—Incoming Transaction

At operation 1020, security manager 310 causes end-user access to a new incoming transaction to be temporarily prevented, ensuring that security manager 310 accesses the new transaction prior to end users being able to access that transaction. At operation 1050, security manager 310 causes end user access to the new transaction to be restored. In embodiments of the present invention, causing prevention and restoration are performed using a network API for the service.

In one embodiment of the present invention, operation 1020 is performed by using network API calls to quickly move a new transaction from an end user accessible location, such as an end user's inbox, to a quarantine location, as soon as occurrence of the new transaction is discovered at operation 1015.

Operation 1020 may optionally include a workflow that is triggered when a transaction is moved to a quarantine location. The workflow may include causing the service to place a message in an end user accessible location, such as an end user's inbox, the message including an explanation of the quarantine operation, and some highlights from the quarantined transaction. The workflow may also or alternatively include causing the service to provide a link enabling an end user to request release of a transaction from quarantine, or receiving a request from a user to release a transaction and optionally prompting an administrator to allow or deny the user's request.

Operation 1050 may be performed using network API calls to move a transaction from a quarantine location to an end user accessible location, such as an end user's inbox. Alternatively, operation 1050 may be performed by using API calls to generate a transaction that is identical to the quarantined transaction, and placing the thus-generated transaction in the end user accessible location. Operation 150 may optionally cause the service to add helpful text into a restored transaction, indicating that the transaction has been scanned and cleared.

Operation 150 may further optionally check if a transaction to be restored includes hyperlinks and, if so, re-direct the hyperlinks to a safe browsing system that scans the content of a link destination upon activation of a hyperlink by a user, to check if the link destination is safe for browsing.

In another embodiment of the present invention, operation 1020 is performed by setting security platform rules within the one or more data-exchange services 220, 230 and 240, the rules causing the service to automatically move new transactions from end user accessible locations, such as end user inboxes, to quarantine locations. The security platform rules may be set manually or via network APIs. The security platform rules are created by cloud security manager 310, and set to be applied within the one or more data-exchange services. The one or more data-exchange services apply these rules prior to placing new transactions being in an end user's inbox.

If necessary for a particular cloud service, the security platform rules are set up so that they do not apply again to transactions that were restored at operation 1050. If needed, restored transactions are marked with a special marking, and the security platform rules are defined so as to ignore transactions that are thus-marked. Furthermore, when special markers are used at operation 1045, then for security purposes and as appropriate, the special markers are regularly changed from time to time, so that if a special marker is discovered by a hacker, he cannot use it for any length of time to bypass security manager 310.

The security platform rules may optionally be set up to be fail-safe; i.e., so that the enterprise does not lose access to services 220, 230 and 240 in case of a fatal failure of security manager 310. Specifically, the security platform rules may be set up so as to expire after a short time period, such as after five minutes, or so as to apply to data during a specific short time period, such as during a five minute interval, and shortly before or after the end of such time period new security platform rules are set up for a next short time period. As such, if security manager 310 were to fail, then new transactions would not be processed by security manager 310, and enterprise data center 100 would operate as if the security layer of cloud security platform 300 had not been added. Transactions being processed during failure of security manager 310 would be re-introduced to end users after the short time period, and the enterprise would lose access to services 220, 230 and 240 for at most five minutes.

It is of advantage that the security platform rules move new transactions to quarantine locations that are not easily accessible to end users. The quarantine locations may be, for example, in a trash folder or a subfolder thereof. This embodiment has the advantage that contents of a trash folder generally go unnoticed by an end user. This embodiment has a further advantage that generally cloud services have a very simple API in place to restore a message from trash to its original location, which runs faster and scales better than restoring a message from a general quarantine folder.

The quarantine locations may be, for example, within a folder that is invisible to an end user, including inter alia a root folder, with an empty string name " " as its parent folder, or subfolder thereof. This embodiment has the advantage that the folder exists but is invisible and inaccessible to an end user.

In some embodiments of the present invention, a watch service is run, which identifies, via a network API, new transactions that are stuck in quarantine locations; i.e., transactions that were moved to a quarantine location at operation 1020, but that have not yet been restored at operation 1050 after lapse of a long time, such as 15 minutes. The watch service causes the service to move such transactions back to user inboxes, automatically and/or conditionally, based on a policy configuration. The watch service provides a safety precaution that prevents a transaction from disappearing in case of an unexpected system problem or failure.

Figure 6:
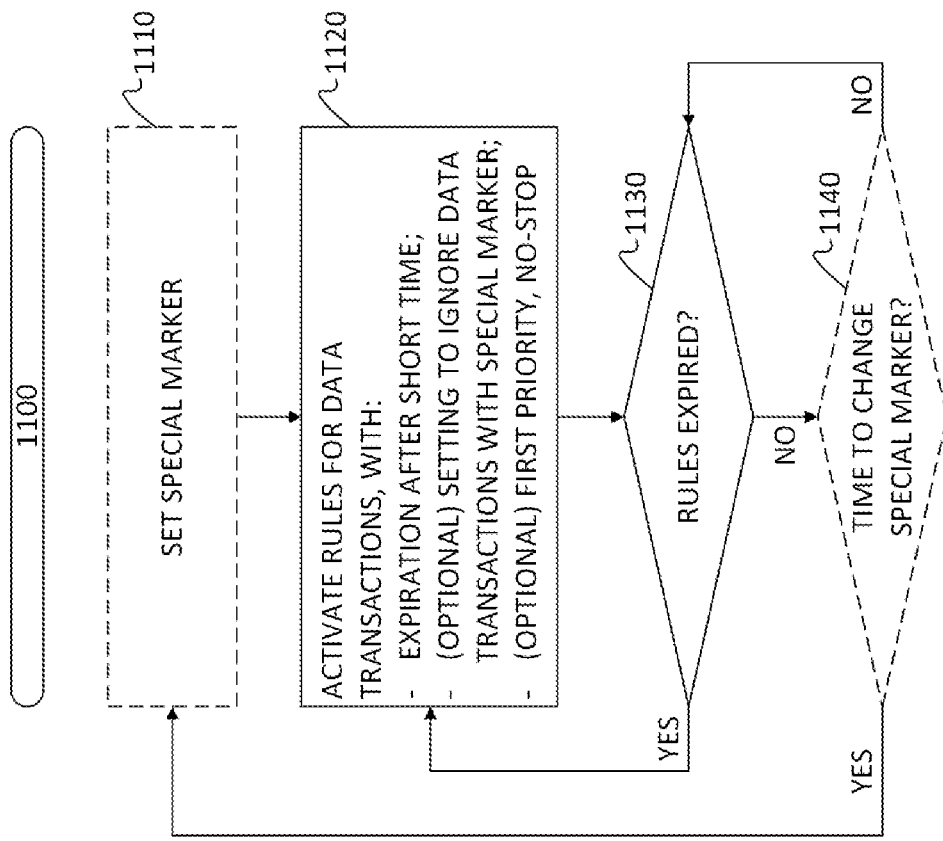
FIG. 6 is a simplified flowchart for a method for setting rules for cloud security, in accordance with an embodiment of the present invention.

Reference is made to FIG. 6, which is a simplified flowchart for a method 1100 for setting rules for cloud security, in accordance with an embodiment of the present invention. Method 1100 begins at optional operation 1110, where a special marker is assigned, for marking restored data transactions, which already passed inspection. At operation 1120, security platform rules are activated, with (i) expiration after a short time period, such as five minutes, (ii) an optional setting to ignore data transactions that are marked with the special marker set at operation 1110, and (iii) with an optional first priority to precede any other rules set by an end-user but with a "no-stop" attribute so as not to preempt other rules set by an end-user. These settings ensure that the end user's rules will be applied, but only after the security platform rules are applied. Regarding expiration of security platform rules, generally these rules are set so as to apply to transactions that arrive within a specific time period, such as a 5 minute time interval. If these rules are not refreshed after the time period, then they are no longer applied. As such, setting of their active time periods effectively sets their expiration.

At operation 1130, a decision is performed to determine whether or not the security platform rules have expired. If so, then the method returns to operation 1120 to re-activate the rules for a next short period of time. Otherwise, the method proceeds to optional operation 1140, where a decision is performed to determine whether or not the special marker should be changed. For security purposes, the special marker is changed at regular periods of time, in case a hacker reverse engineers the marker and tries to by-pass the security platform rules. If the special marker should be changed, then the method returns to operation 1110 to re-set the marker. Otherwise, the method returns to operation 1130.

For an e-mail service 240, operations 1020 and 1050 may comprise, respectively, inter alia one or more of the following:

(i) security manager 310 causes service 240 to prevent end user access by causing service 240 to move the e-mail from an inbox of an end user to a quarantine folder or quarantine mailbox, and causes service 240 to restore end user access by causing service 240 to move the e-mail from the quarantine folder or quarantine mailbox to the inbox of the end user;

(ii) security manager 310 causes service 240 to prevent end user access by causing service 240 to remove an attachment from the e-mail, and causes service 240 to restore end user access by causing service 240 to reinsert the attachment into the e-mail;

(iii) security manager 310 causes service 240 to alter the e-mail, e.g., by adding text like "virus alert", so that an end user sees the e-mail in his mailbox, but the e-mail has a subject line or message body with warning text alerting the user of a risk;

(iv) security manager 310 causes service 240 to prevent end user access by causing service 240 to replace an attachment of the e-mail with a substitute attachment, and causes service 240 to restore end user access by causing service 240 to reinsert the original attachment into the e-mail;

(v) security manager 310 causes service 240 to prevent end user access by causing service 240 to encrypt an attachment of an e-mail, and causes service 240 to restore end user access by causing service 240 to decrypt the encrypted attachment.

For a file sharing service 230, operations 1020 and 1050 may comprise, respectively, inter alia one or more of the following:

(i) security manager 310 causes service 230 to prevent end user access by causing service 230 to instantly alter or revoke share access to the file, and causes service 230 to restore end user access by causing service 230 to re-share the file with its original recipients;

(ii) security manager 310 causes service 230 to prevent end user access by causing service 230 to instantly alter or revoke access rights to the file, and causes service 230 to restore end user access by causing service 230 to restore access rights to the file;

(iii) security manager 310 causes service 230 to prevent end user access by causing service 230 to move the file from a main folder to a quarantine folder, and causes service 230 to restore end user access by causing service 230 to move the file from the quarantine folder to the main folder;

(iv) security manager 310 causes service 230 to prevent end user access by causing service 230 to instantly designate the file as "online-only" such that the file cannot be downloaded, and causes service 230 to restore end user access by causing service 230 to designate the file as "downloadable";

(v) security manager 310 causes service 230 to prevent end user access by causing service 230 to instantly change an end user access level of the file so that the file is not visible to the end user, and causes service 230 to restore end user access by causing service 230 to restore the end user access level of the file;

(vi) security manager 310 causes service 230 to prevent end user access by causing service 230 to encrypt the file, and causes service 230 to restore end user access by causing service 230 to decrypt the encrypted file;

(vii) security manager 310 causes service 230 to prevent end user access by causing service 230 to replace the original file with a substitute file, and causes service 230 to restore end user access by causing service 230 to replace the substitute file with the original file.

Operations 1020 and 1050—Outgoing Transaction

At operation 1020, security manager 310 causes transmission of a new outgoing transaction to be prevented, ensuring that security manager 310 accesses the new transaction prior to that transaction being transmitted. At operation 1050, security manager 310 transmits the new transaction to its destination. In some embodiments of the present invention, prevention and restoration are performed using a network API for the service.

Some services 220, 230 and 240 allow for "delayed sending", setting a delay time e.g., 30 seconds, during which time an end user may cancel transmission of a data transaction. Security manager 310 may use this time period to scan the transaction using content filters and data leakage prevention scanners. If the transaction is discovered to violate an enterprise policy, then at operation 1020 the transaction is moved to a quarantine folder and blocked from being transmitted.

Operation 1025 (Optional)

At operation 1025, security manager optionally causes the service to alert recipients that the new transaction has been temporarily prevented, and that an inspection process is being performed. In one embodiment of the present invention, causing the alerting is performed using a network API for the service.

Operation 1025 may comprise inter alia one or more of the following:
  (i) send a notification e-mail, resembling the newly arrived e-mail, to the same recipients as those of the newly arrived e-mail, with an explanation that the e-mail is being scanned, and/or instructions regarding the inspection process, and replace the notification e-mail with the newly arrived email after the latter passes inspection;
  (ii) attach a notification file, instead of the original attachment, to a newly-arrived e-mail, with an explanation and/or instructions regarding the inspection process;
  (iii) share a file, that has similar access rights and a similar name and folder to a newly shared file, with an explanation and/or instructions regarding the inspection process.

It is noted that operation 1020 ensures that an end user does not have a chance to interact with not-yet-inspected data, and operation 1025 informs the end user that new data is currently being inspected. Operations 1020 and 1025 may occur simultaneously, before the actual inspection is conducted. Alternatively, operation 1025 may occur at another stage in the flowchart of method 1000, and not necessarily between operations 1020 and 1030.

Operation 1035—Incoming Transaction

At operation 1035, data inspector 320 inspects the data of a new incoming transaction. Data inspector 320 may use any of a variety of manual or automated content scanning technologies, as required by enterprise 100. It is noted that operation 1035 does not need to be performed on-the-fly in real time, since end uses cannot interact with the data being inspected during operation 1035.

Figure 7:
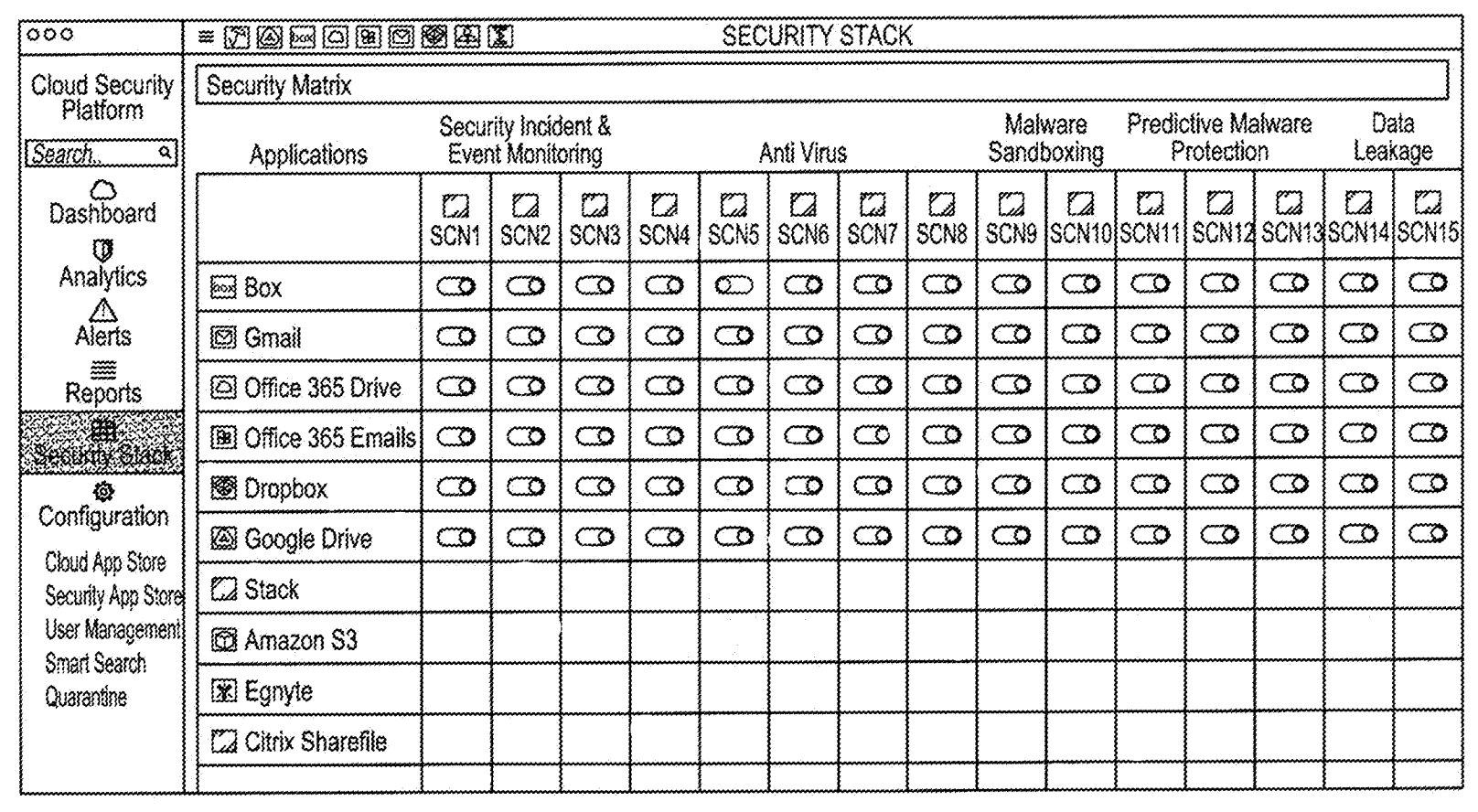

Reference is made to FIG. 7, which is a screen shot of a security stack interface, showing a configuration of cloud services and data inspectors, in accordance with an embodiment of the present invention. For each of a plurality of cloud services, such as services 220, 230 and 240, an administrator selects which of a plurality of commercial content scanners are applied to that service. The configuration is displayed as a matrix for which each row is a different service, including inter alia:
  the BOX® service of Box.net, Inc. of Palo Alto, Calif., USA,
  the GMAIL® service of Google, Inc. of Mountain View, Calif., USA,
  the OFFICE 365° One Drive service of Microsoft Corporation of Redmond, Wash., USA,
  the OFFICE 365° E-mail service of Microsoft Corporation of Redmond, Wash., USA,
  the DROPBOX® service of Dropbox, Inc. of San Francisco, Calif., USA,
  the GOOGLE® Drive service developed by Google Inc. of Mountain View, Calif., USA,
  the SLACK® service developed by Slack Technologies, Inc. of San Francisco, Calif., USA,
  the AMAZON® S3 cloud storage service developed by Amazon Technologies, Inc. of Reno, Nev., USA, and
  the EGNYTE® service of Egnyte Inc. of Mountain View, Calif., USA, and
  the SHAREFILE® service by Citrix Systems Inc. of Raleigh, N.C., USA.

Each column is a different content scanner, SCN1, SCN2, . . . , SCN 15. The content scanners may include inter alia:
  the SOPHOS® scanner developed by Sophos plc Corporation of Oxfordshire, England,
  the CHECK POINT® scanner developed by Checkpoint Software Technologies of Tel Aviv, Israel,
  the AHNLAB® scanner developed by Ahnlab, Inc. of South Korea,
  the AVG® scanner developed by AVG Netherlands B.V. of Amsterdam,
  the AVIRA® scanner developed by Avira Operations GmbH of Germany,
  the BITDEFENDER® scanner developed by Bitdefender IPR Management Ltd. of Cyprus,
  the ESET® scanner developed by Eset spol. s.r.o. Corporation of Bratislava Slovakia,
  the KASPERSKY® scanner developed by Kaspersky Lab of Moscow, Russia,
  the F-PROT® scanner developed by Cyren Inc. of McLean, Va., USA,
  the CYANCE® scanner developed by Cylance Inc., of Irvine, Calif., USA, and
  the SYMANTEC® scanner developed by Symantec Corporation of Mountain View, Calif., USA.

Reference is made to FIGS. 8-13, which are respective screen shots of dashboards displaying results of several content scanners for six cloud services (Google Drive, Box.net, Office 365 One Drive, Office 365 E-mail, Gmail and Dropbox), in accordance with an embodiment of the present invention.

Figure 8:
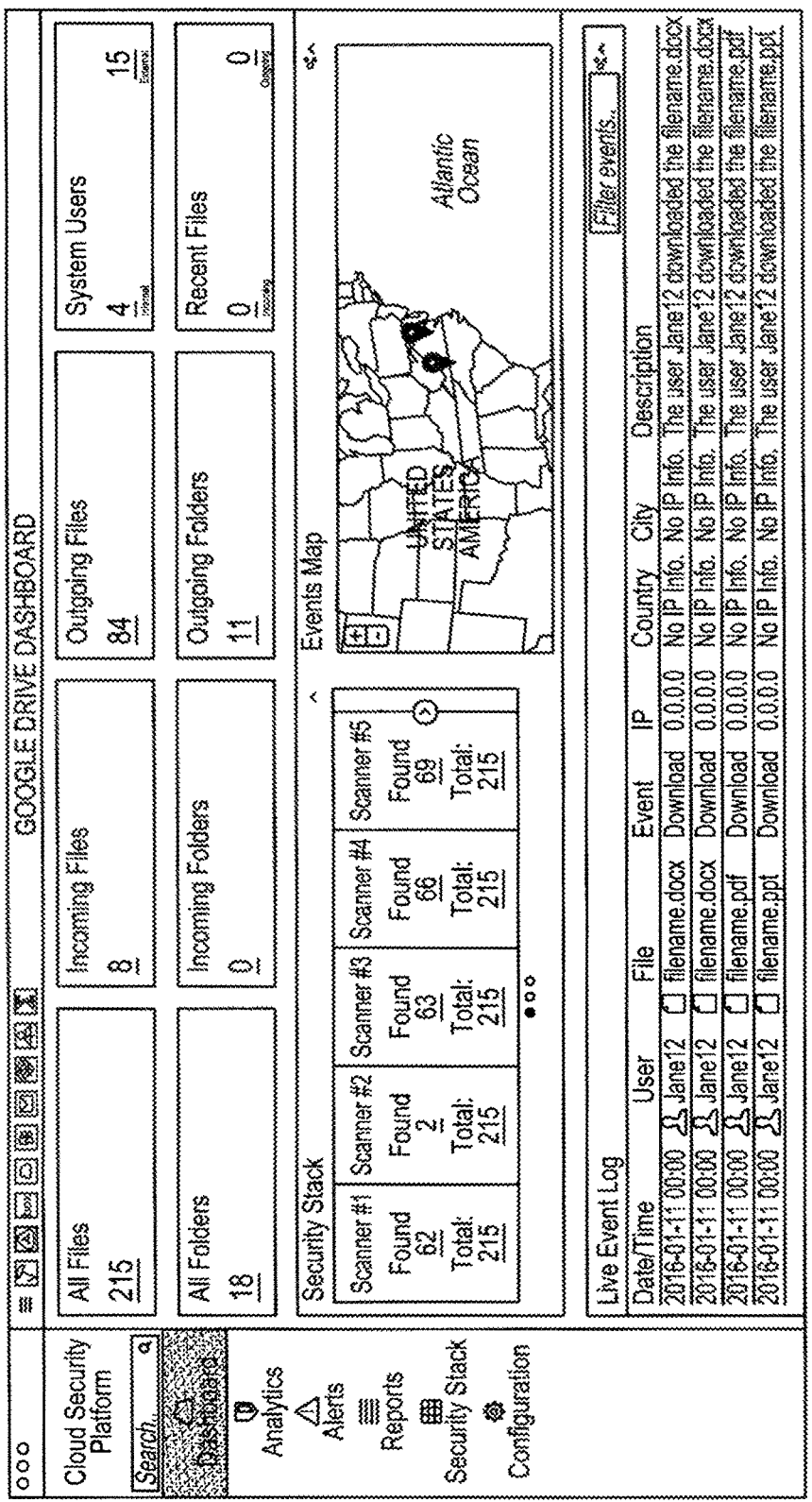
FIGS. 8-13 are respective screen shots of dashboards displaying results of several content scanners for six cloud services, in accordance with an embodiment of the present invention.

FIG. 8 shows a dashboard console for Google Drive, displaying statistics of overall traffic and malicious content in a Security Stack zone, showing that Scanner #1 found 62 suspicious files out of a total of 215 files, Scanner #2 found 2 suspicious files out of the 215 files, Scanner #3 found 63 suspicious files out of the 215 files, Scanner #4 found 66 suspicious files out of the 215 files, and Scanner #5 found 69 suspicious files out of the 215 files.

Figure 9:
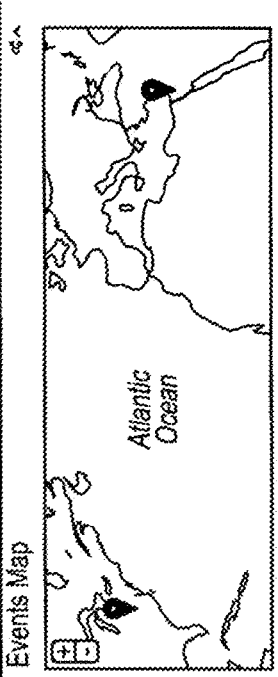

FIG. 9 shows a dashboard console for Box.net, displaying statistics of overall traffic and malicious content in a Security Stack zone, showing that Scanner #1 found 41 suspicious files out of a total of 382 files, Scanner #2 found 16 suspicious files out of the 382 files, Scanner #3 found 38 suspicious files out of the 382 files, Scanner #4 found 55 suspicious files out of the 382 files, and Scanner #5 found 67 suspicious files out of the 382 files.

Figure 10:
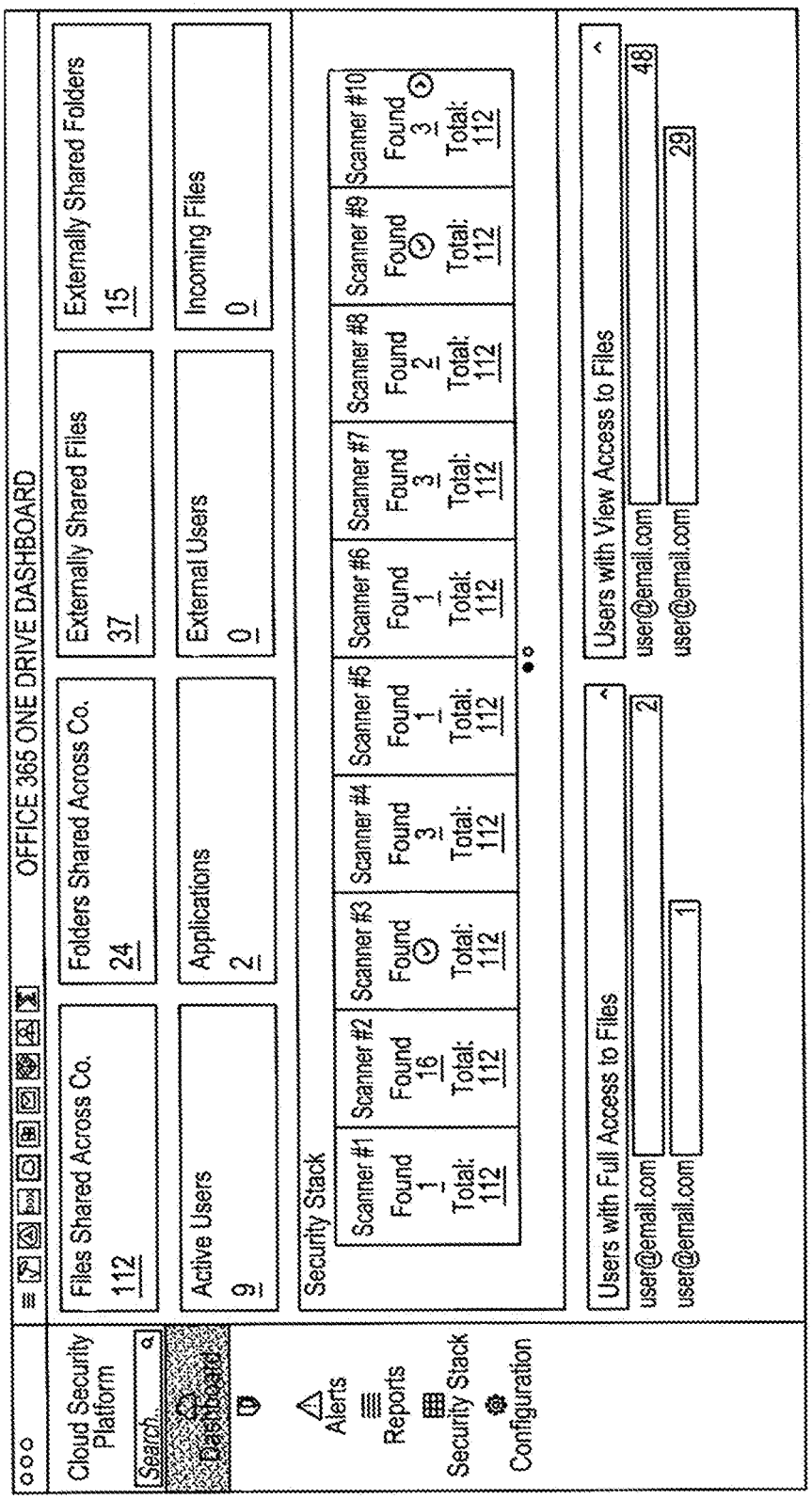

FIG. 10 shows a dashboard console for Office 365 One Drive, displaying statistics of overall traffic and malicious content in a Security Stack zone, showing that Scanner #1 found 1 suspicious file out of a total of 112 files, Scanner #2 found 1 suspicious file out of the 112 files, Scanner #3 found no suspicious files out of the 112 files, Scanner #4 found 3 suspicious files out of the 112 files, Scanner #5 found 1 suspicious file out of the 112 files, Scanner #6 found 1 suspicious file out of the 112 files, Scanner #7 found 3 suspicious files out of the 112 files, Scanner #8 found 2 suspicious files out of the 112 files, Scanner #9 found no suspicious files out of the 112 files, and Scanner #10 found 3 suspicious files out of the 112 files.

Figure 11:
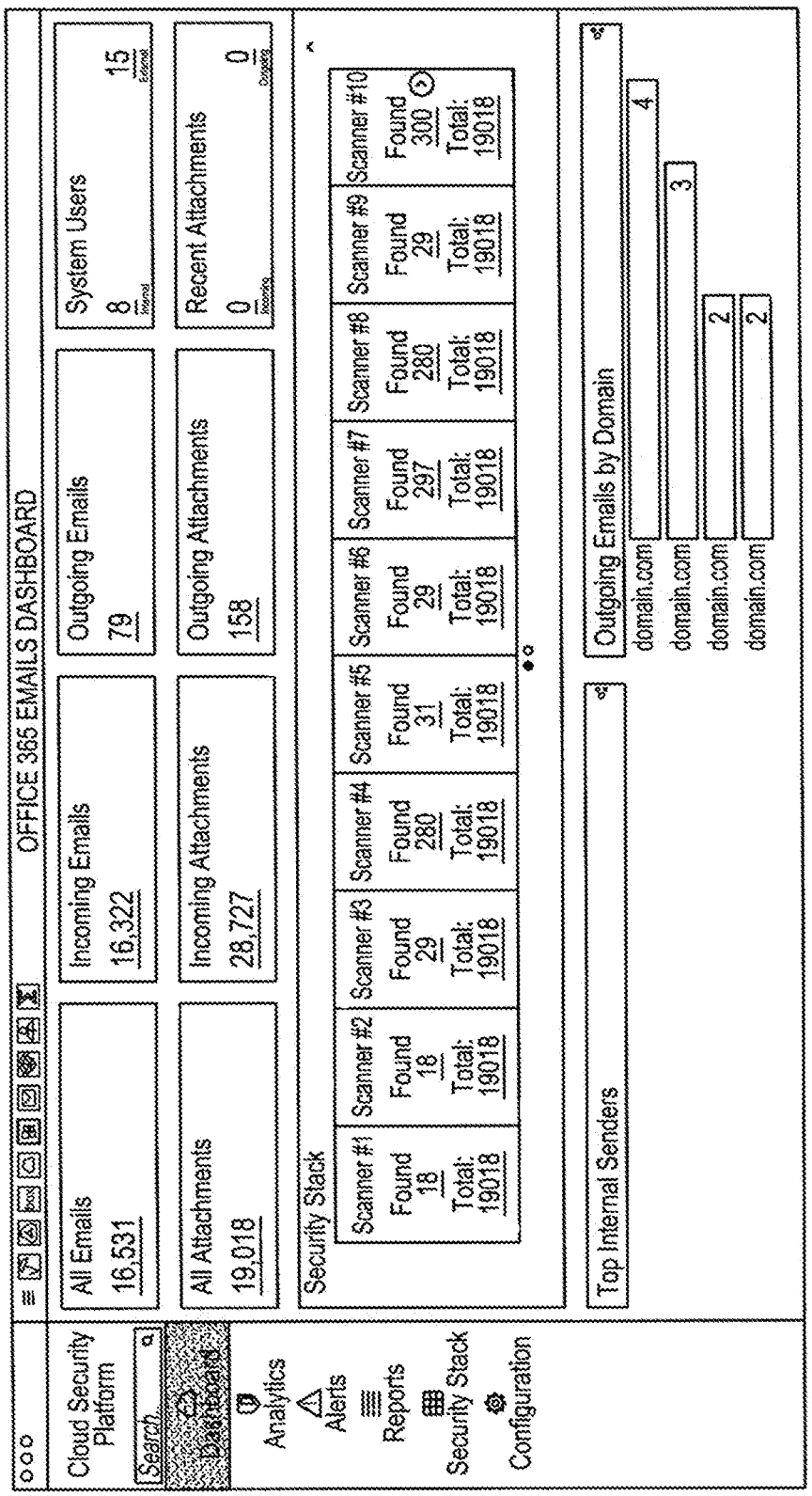

FIG. 11 shows a dashboard console for Office 365 E-mail, displaying statistics of overall traffic and malicious content in a Security Stack zone, showing that Scanner #1 found 18 suspicious e-mails out of a total of 19,018 e-mails, Scanner #2 found 18 suspicious e-mails out of the 19,018 e-mails, Scanner #3 found 29 suspicious e-mails out of the 19,018 e-mails, Scanner #4 found 280 suspicious e-mails out of the 19,018 e-mails, Scanner #5 found 31 suspicious e-mails out of the 19,018 e-mails, Scanner #6 found 29 suspicious e-mails out of the 19,018 e-mails, Scanner #7 found 297 suspicious e-mails out of the 19,018 e-mails, Scanner #8 found 280 suspicious e-mails out of the 19,018 e-mails, Scanner #9 found 29 suspicious e-mails out of the 19,018 e-mails, and Scanner #10 found 300 suspicious e-mails out of the 19,018 e-mails.

Figure 12:
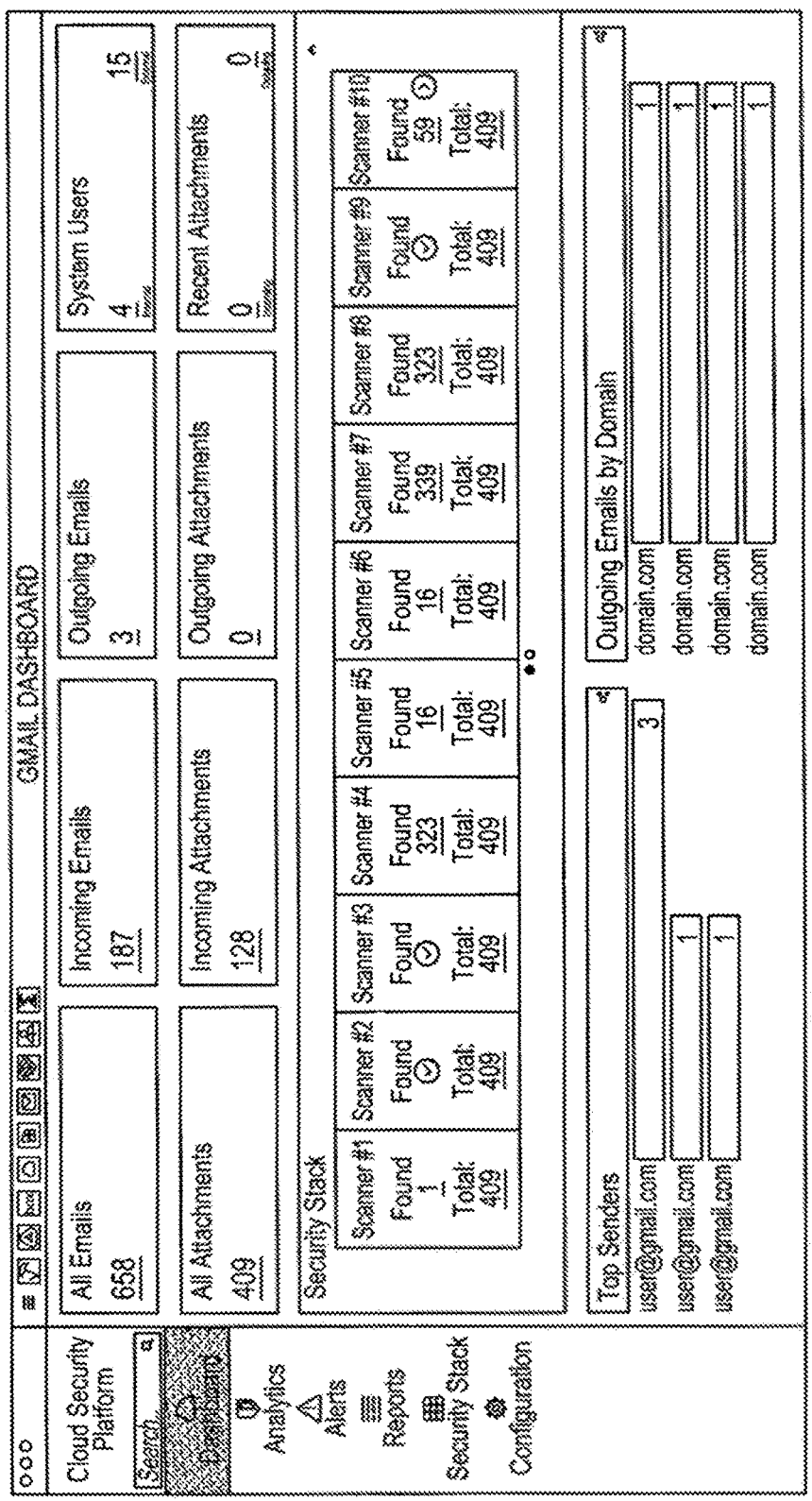

FIG. 12 shows a dashboard console for Gmail, displaying statistics of overall traffic and malicious content in a Security Stack zone, showing that Scanner #1 found 1 suspicious e-mail out of a total of 409 e-mails, Scanner #2 found no suspicious e-mails out of the 409 e-mails, Scanner #3 found no suspicious e-mails out of the 409 e-mails, Scanner #4 found 323 suspicious e-mails out of the 409 e-mails, and Scanner #5 found 16 suspicious e-mails out of the 409 e-mails, Scanner #6 found 16 suspicious e-mails out of the 409 e-mails, Scanner #7 found 339 suspicious e-mails out of the 409 e-mails, Scanner #8 found 323 suspicious e-mails out of the 409 e-mails, Scanner #9 found no suspicious e-mails out of the 409 e-mails, and Scanner #10 found 59 suspicious e-mails out of the 409 e-mails.

Figure 13:
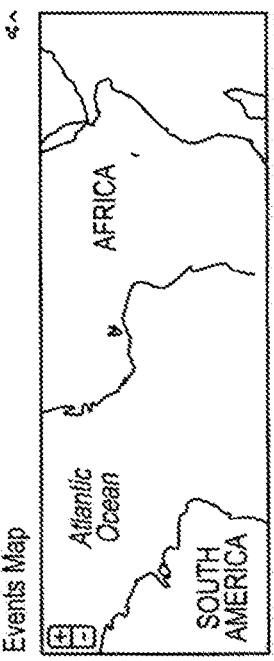

FIG. 13 shows a dashboard console for Dropbox, displaying statistics of overall traffic and malicious content in a Security Stack zone, showing that no files were processed.

Reference is made to FIG. 14, which is a screen shot of a main dashboard displaying overall results for several cloud services, in accordance with an embodiment of the present invention. FIG. 14 shows a dashboard visualization of statistics of overall traffic, malicious content blocked, and data-loss prevention (DLP). Specifically, FIG. 14 indicates a total of 6,261 malicious files, and 365 malicious incoming files; a total of 1,066 files with data leaks, and 445 outgoing files with data leaks.

Reference is made to FIG. 15, which is a screen shot of an analytics interface for cloud services, in accordance with an embodiment of the present invention. FIG. 15 shows results of a queries submitted by an administrator. Specifically, FIG. 15 indicates 2 driver's license files shared externally on Box.net, 34 credit card numbers shared externally on Google Drive, 44 company confidential files on Box.net, etc.

Figure 16:
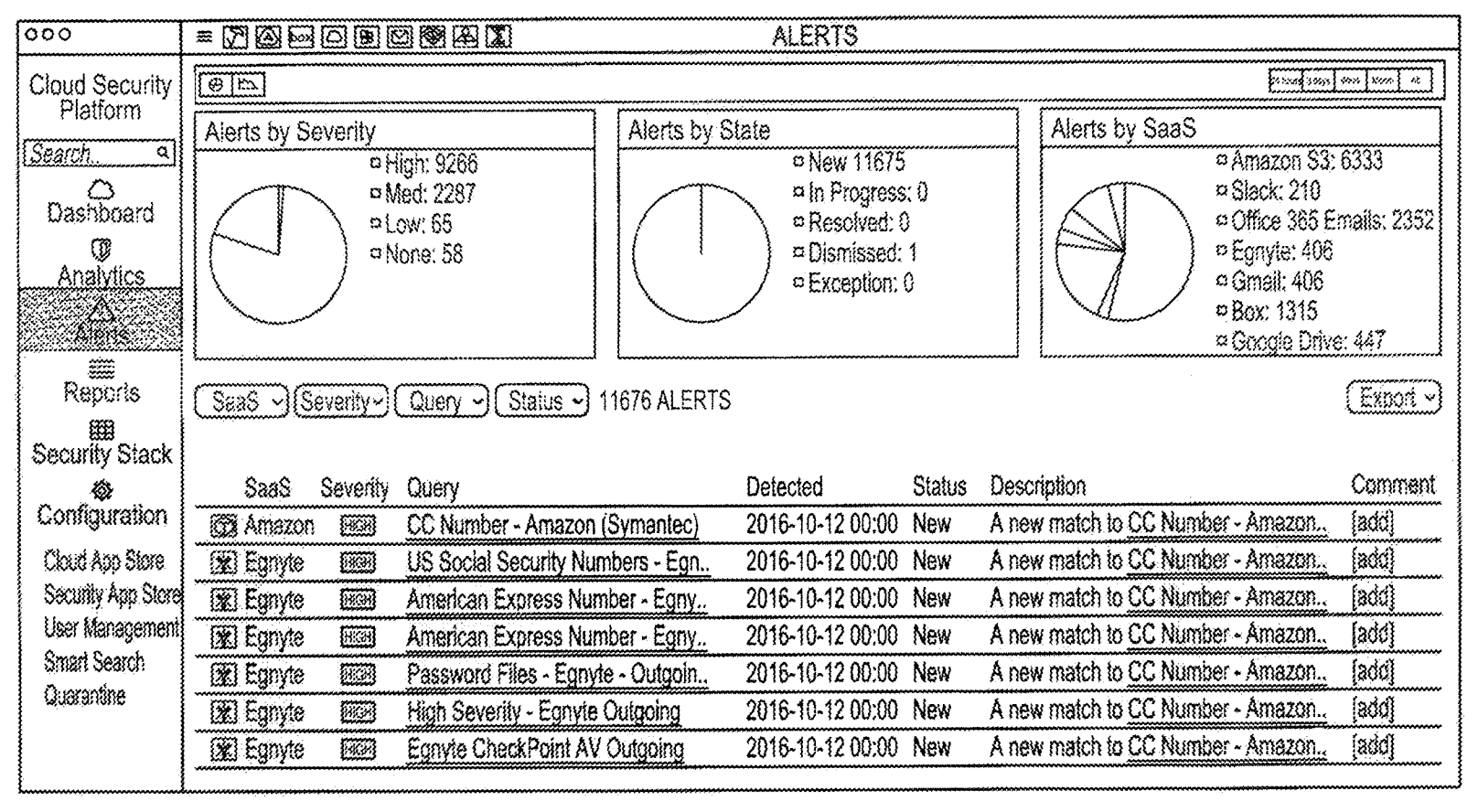

Reference is made to FIG. 16, which is a screen shot of an alerts interface for cloud services, in accordance with an embodiment of the present invention. FIG. 16 shows visualizations of statistics of alerts made by security manager 310. Specifically, FIG. 16 indicates 11,676 alerts of which 9,266 are of high severity, 2,287 are of medium severity, 65 are of low severity, and 58 are of no severity; 11,675 of the alerts are new alerts, and 1 alert is dismissed; 6,333 of the alerts are from Amazon S3 cloud, 210 of the alerts are from Slack, 2,352 of the alerts are from Microsoft Office 365 e-mails, 406 of the alerts are from Egnyte, 613 of the alerts are from Gmail, 1,315 of the alerts are from Box.net, and 447 of the alerts are from Google drive.

Operation 1035—Outgoing Transaction

At operation 1035, data inspector 320 inspects the data of a new outgoing transaction. Data inspector 320 may use any of a variety of manual or automated data leakage protection technologies, as required by enterprise 100.

Operation 1055

At operation 1055, security manager 310 causes the service to perform a remedial action vis-à-vis the new transaction. In one embodiment of the present invention, causing of the remedial action is performed using a network API for the service.

Operation 1055 may comprise inter alia one or more of the following:
(i) causing the service to permanently prevent end user access to the data of the transaction;
(ii) causing the service to replace the data of the transaction with modified data;
(iii) causing the service to alert an administrator of enterprise 100.

In addition, security manager 310 may conduct an analysis the data of the transaction possibly via a security analysis cloud service.

Policy Enforcement

It will be appreciated by those skilled in the art that, in addition to scanning of content for data transactions, cloud security platform 300 provides security policy enforcement for enterprise 100.

Reference is made to FIGS. 17-20, which are self-explanatory simplified drawings of various policies enforced by cloud security system 300, in accordance with an embodiment of the present invention.

Figure 17:
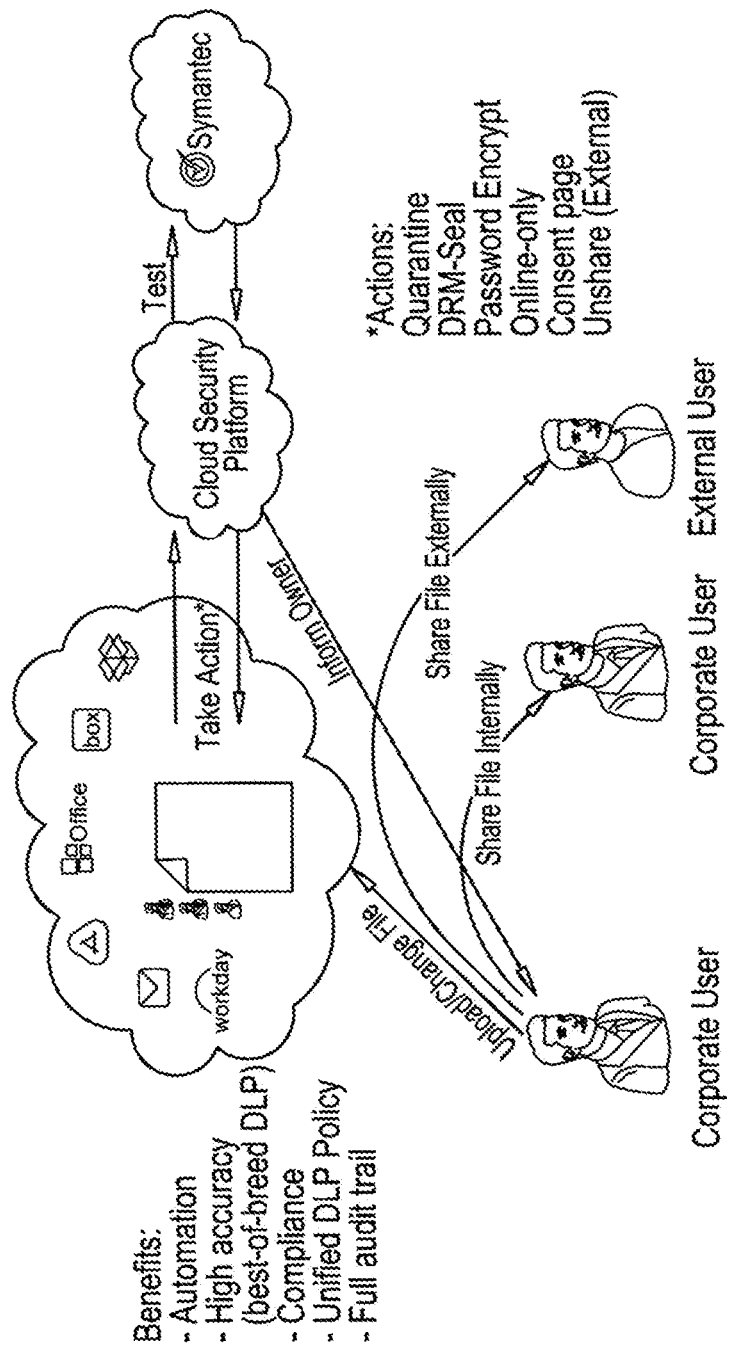
FIGS. 17-20 are self-explanatory simplified drawings of various policies enforced by a cloud security system, in accordance with an embodiment of the present invention.

FIG. 17 shows a policy for data leakage scan and protection.

Figure 18:
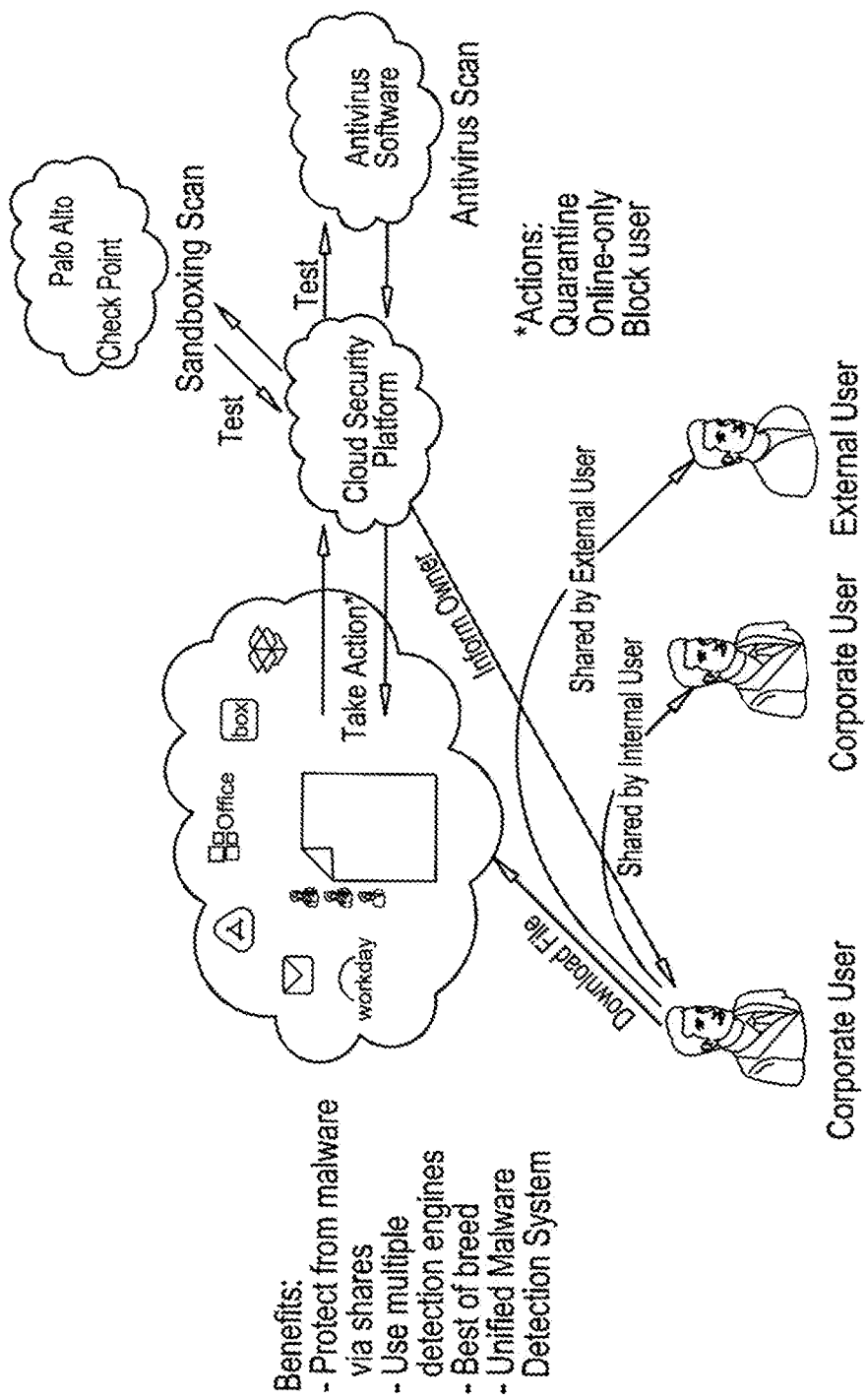

FIG. 18 shows a policy for malware protection.

Figure 19:
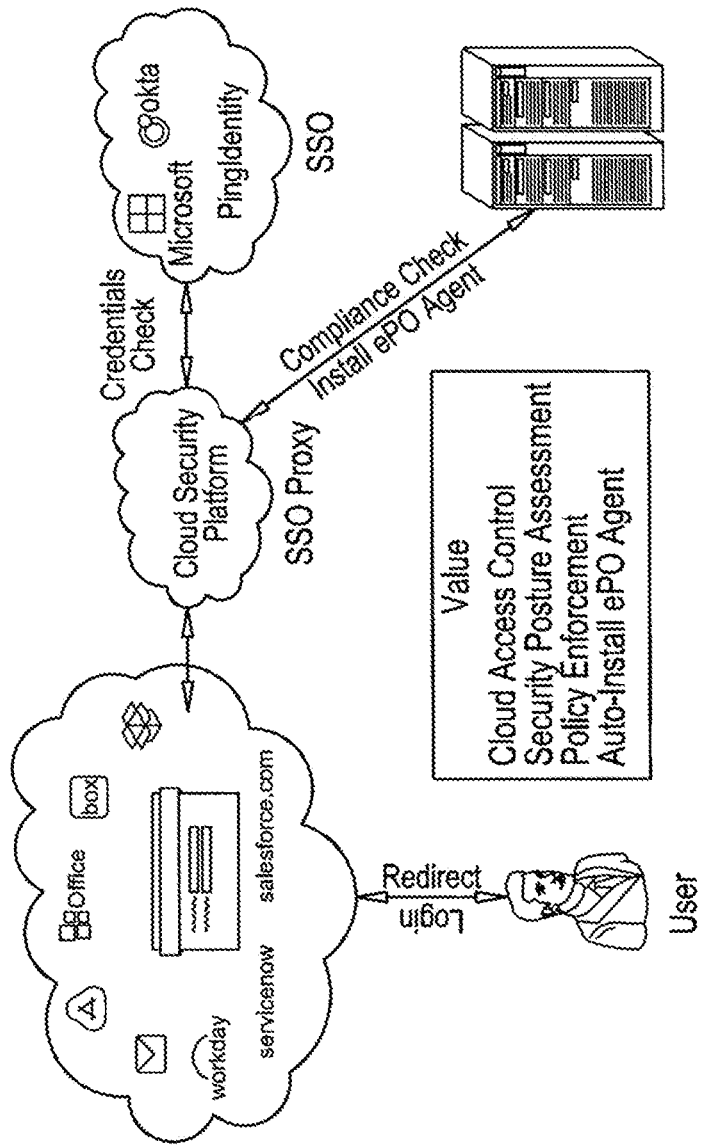

FIG. 19 shows a policy for compliance enforcement for SaaS login, using cloud security platform 300 as a single sign-on (SSO) proxy and using the EPOLICY ORCHESTRATOR® (ePO) security management software developed by McAfee, Inc. of Santa Clara, Calif.

Figure 20:
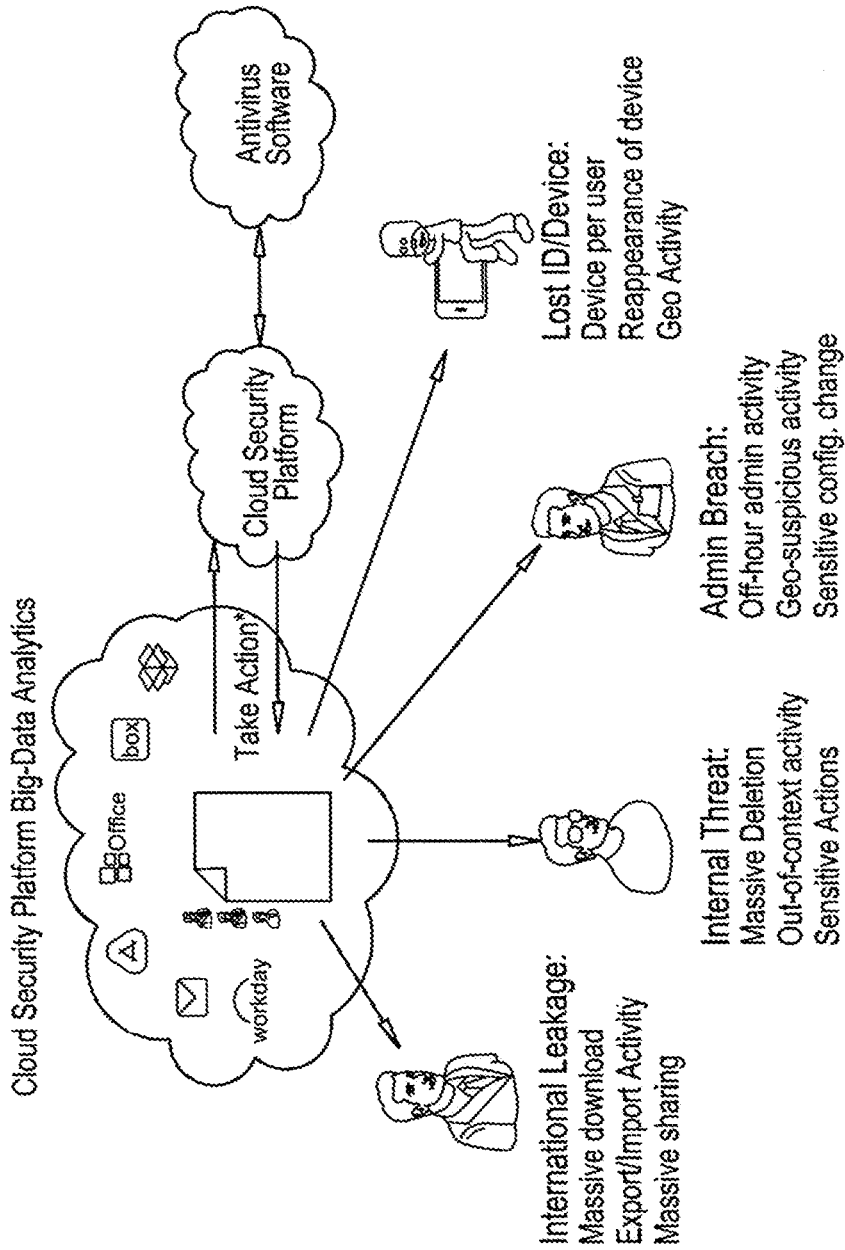

FIG. 20 shows a policy for detection of anomalies including data leakage, internal threats, administrative breaches and lost devices.

Reference is made to FIGS. 21-26, which are self-explanatory simplified drawings of various workflows performed by cloud security system 300, in accordance with an embodiment of the present invention.

Figure 21:
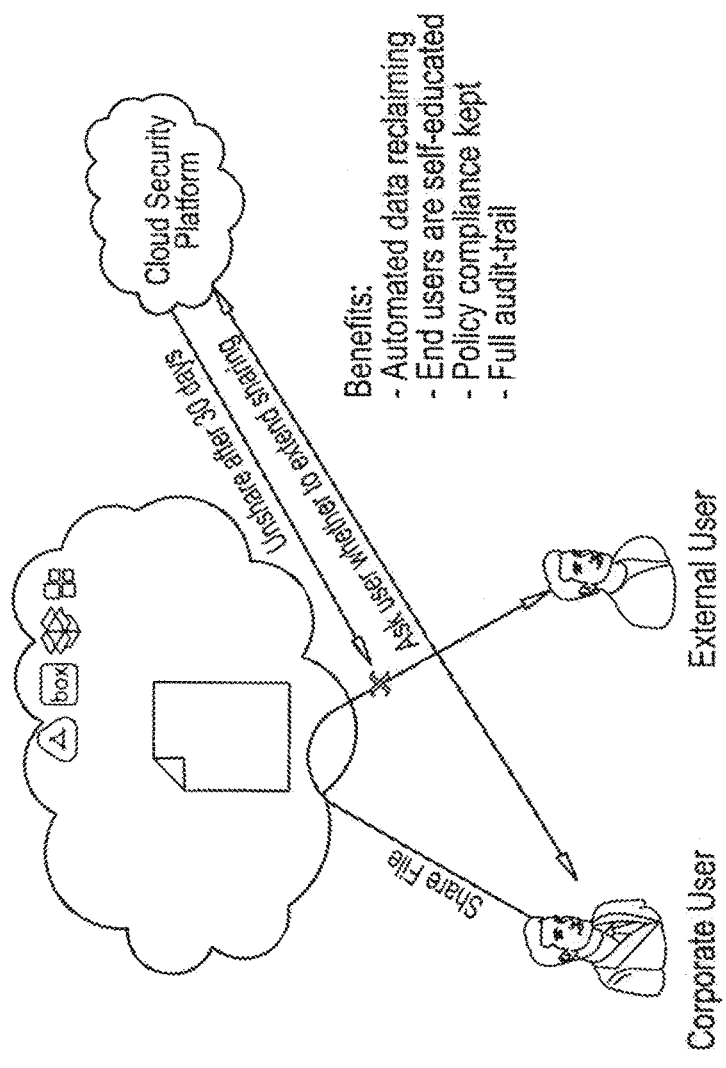
FIGS. 21-26 are self-explanatory simplified drawings of various workflows performed by a cloud security system, in accordance with an embodiment of the present invention.

FIG. 21 shows a workflow for time limits of external sharing.

Figure 22:
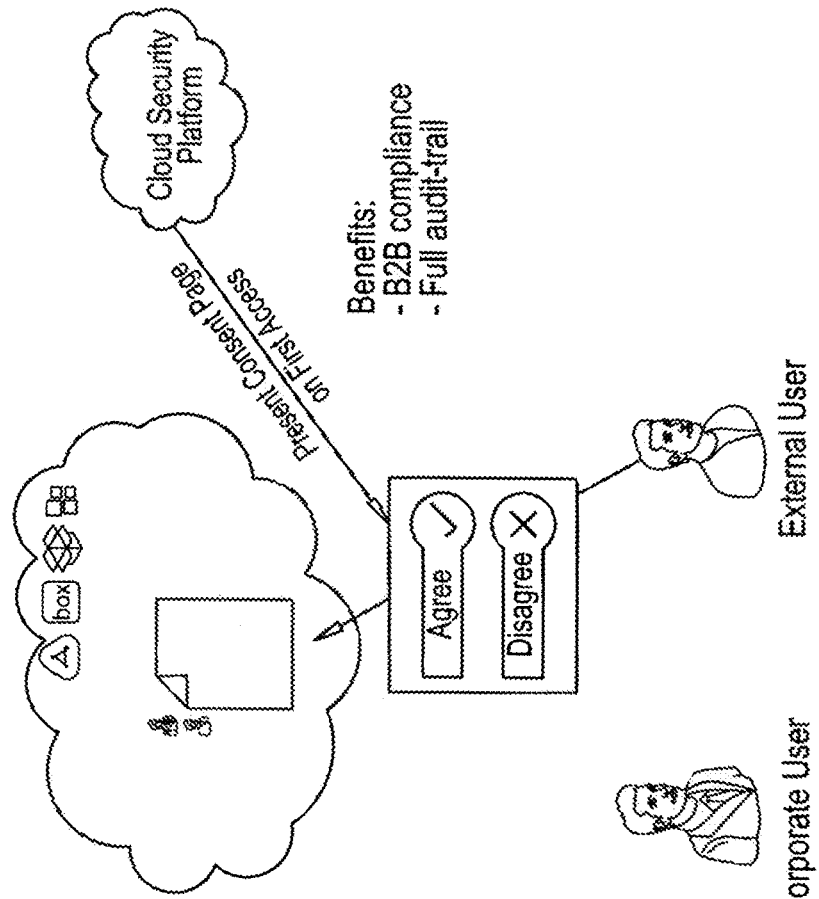

FIG. 22 shows a workflow for consent of sharing data with external users.

Figure 23:
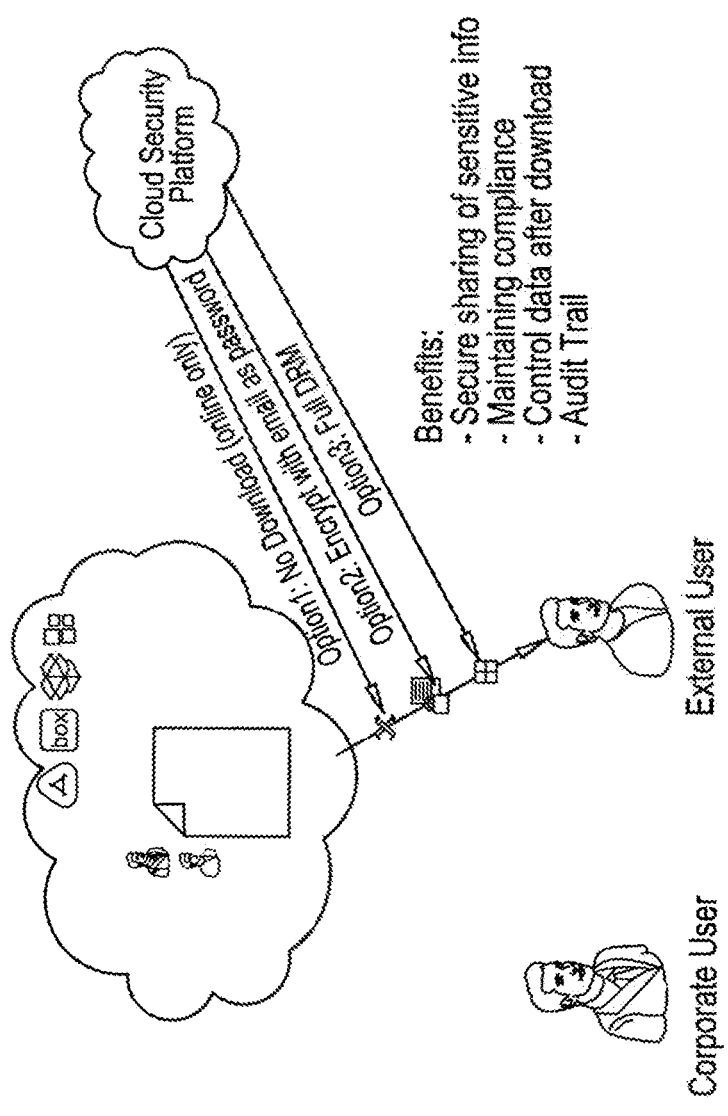

FIG. 23 shows a workflow for external users offloading data.

Figure 24:
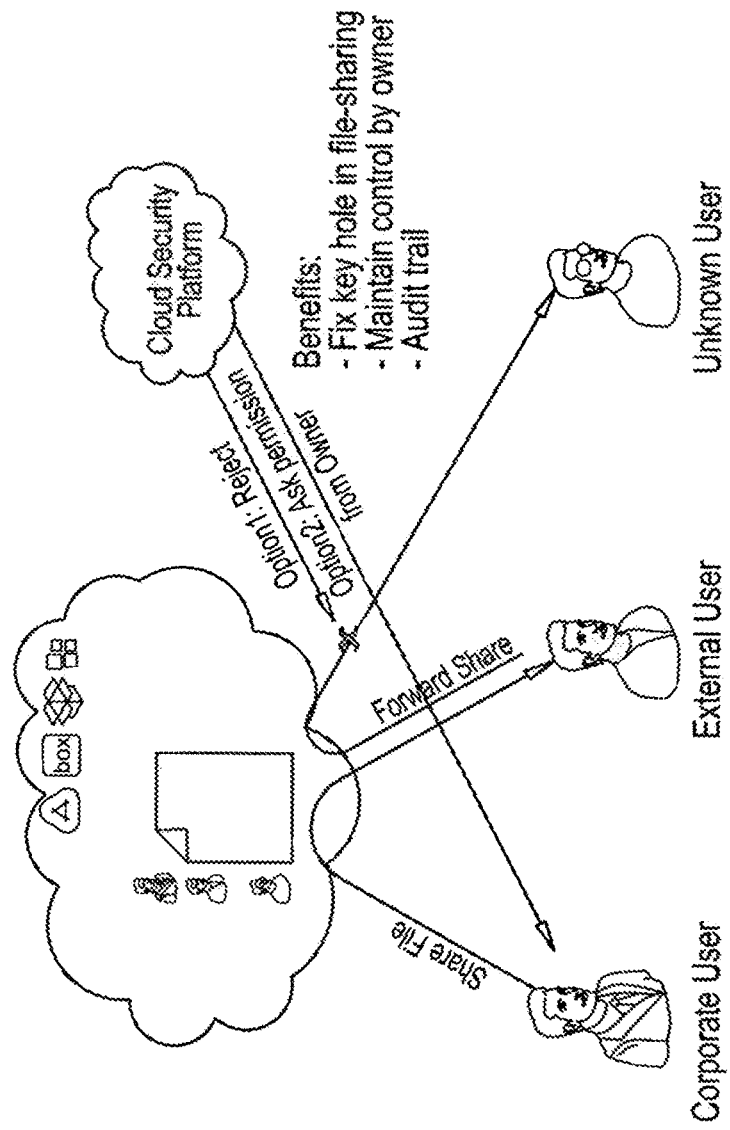

FIG. 24 shows a workflow for forwarding of shared content.

Figure 25:
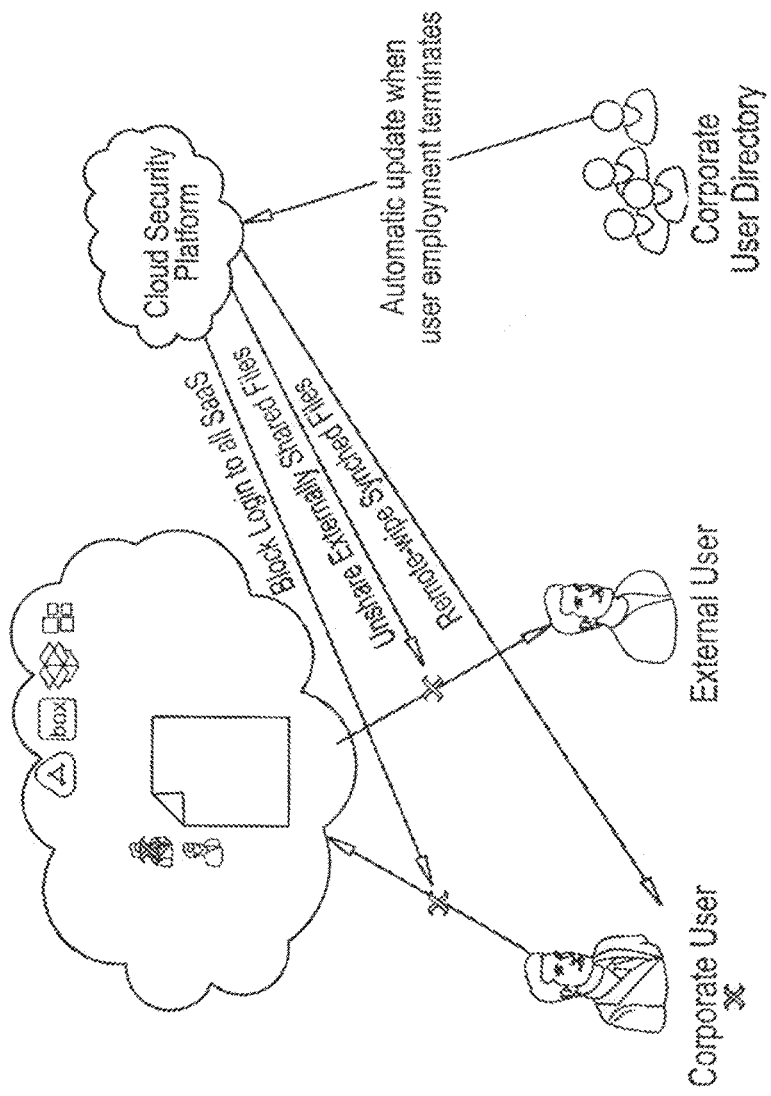

FIG. 25 shows a workflow for termination of an enterprise employee including operations of blocking the employee login to enterprise services, un-sharing that employee's externally shared files, and remote wiping of that employee's synchronized files.

Figure 26:
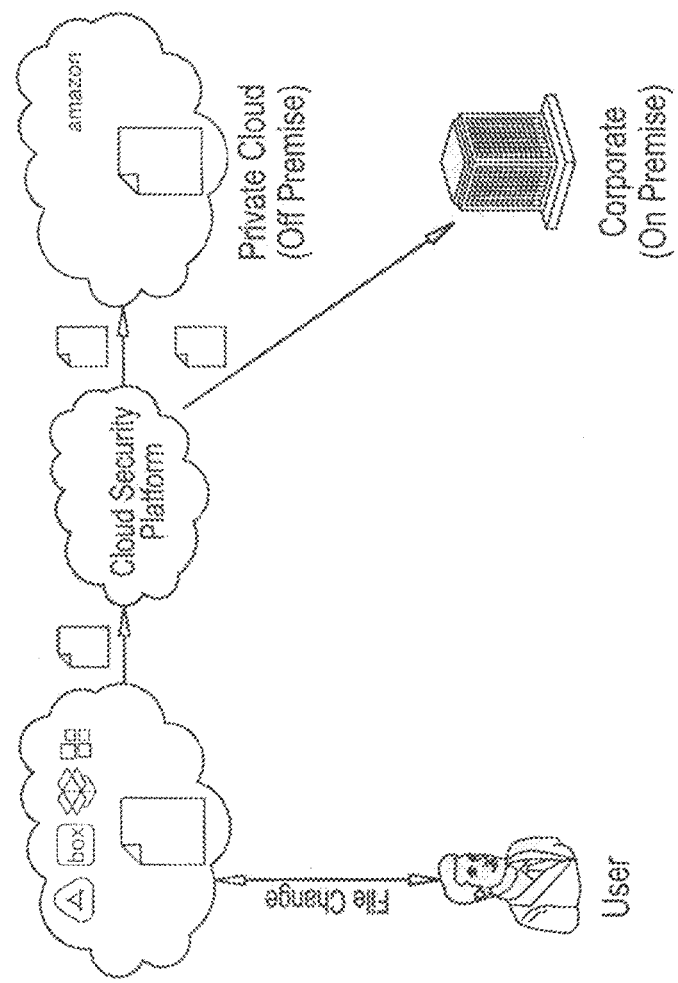

FIG. 26 shows a workflow for backup and version management.

Implementation Details

Appendix A includes a listing with APIs for implementing an embodiment of the present invention, for specific use with Microsoft Office 365 and Google Gmail. Appendix A is structured as follows.

OFFICE 365
1. API for obtaining internal user data
    Example of obtaining internal user data
2. API for managing rules
    Example of rule creation
    Example of rule removal
3. API for creating a folder
4. API for subscribing to web notification
5. API for downloading a message/attachment
6. API for moving a message to Inbox (release)
7. API for quarantining a message to Inbox (quarantine
    Example of quarantining a message
8. API for restoring a message to Inbox (restore)
    Example of restoring a message GMAIL
1. Creating an API object
2. API for obtaining user data
3. API for managing rules
4. API for creating labels
5. API for subscribing to notifications
6. API for reading emails from notifications
7. API for downloading attachments
8. API for changing labels (release)
9. API for quarantine and admin notification Advantages It will thus be appreciate by those skilled in the art that embodiments of the present invention provide the following advantages vis-à-vis conventional enterprise security systems. Because these embodiments are network-API-based, then do not rely on a proxy and are not inline. They are immediately deployable and do not require changes to an enterprise network configuration, nor to the end user experience.

These embodiments effectively block transactions in real-time without being inline.

These embodiments apply to remote data services, cloud-based services, and SaaS applications not under control of the enterprise.

These embodiments do not alter flow of data over a network, and thus do not adversely impact other functional components such as spam-filters, firewalls, routers and proxy servers.

These embodiments do not adversely impact latency and responsiveness of services 220, 230 and 240.

These embodiments are transparent to end users, because their transactions are restored immediately upon completion of inspection.

These embodiments allow participants to partially continue a transaction while inspection of the sensitive components is taking place. For example, an email message will be available while its original attachments are being scanned.

These embodiments are fail-safe, and if security manager 310 fails, the flow of data continues normally. By not proxying traffic and being fail-safe, these embodiments do not introduce any new points of failure.

These embodiments use network-APIs provided by services 220, 230 and 240, thus not requiring reverse-engineering, and not breaking support contracts.

These embodiments use the same configuration and network infrastructure for monitoring/detection and blocking/prevention. As such, the enterprise may start with detection and upgrade to prevention, by changing the configuration of cloud security platform 300, without requiring changes to enterprise networks or to enterprise systems.

These embodiments may be selectively applied to specific users, so that they ignore other users. This has a clear advantage over proxy solutions, which proxy data for all users even if only a few users are being protected.

These embodiments are scalable for large enterprises.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

APPENDIX A

OFFICE 365

1. API for obtaining internal user data

Azure AD Graph API (1) is used to fetch the organization's domain in Azure Active Directory. Then, for each domain, the same API is used to fetch the users for each domain (2).

References
   (1) https://msdn.microsoft.com/en-us/library/azure/ad/graph/api/api-catalog
   (2) https://msdn.microsoft.com/en-us/library/azure/ad/graph/api/users-operations#GetUsers Example of obtaining internal user data

```
1   {
2     "mailNickname": "john21_hotmail.com#EXT#",
3     "postalCode": null,
4     "surname": null,
5     "passwordProfile": {
6       "enforceChangePasswordPolicy": false,
7       "password": null,
8       "forceChangePasswordNextLogin": true
9     },
10    "assignedLicenses": [],
11    "lastDirSyncTime": null,
12    "userPrincipalName": "john21_hotmail.com#EXT#@avanan.onmicrosoft.com",
13    "passwordPolicies": null,
14    "userType": "Guest",
15    "usageLocation": null,
16    "objectType": "User",
```

```
17         "city": null,
18         "assignedPlans": [],
19         "objectId": "3a6e6629-afed-46d6-a45f-77312ebe045d",
20         "facsimileTelephoneNumber": null,
21         "creationType": null,
22         "streetAddress": null,
23         "state": null,
24         "department": null,
25         "mail": "shailelchuk@gmail.com",
26         "preferredLanguage": null,
27         "accountEnabled": true,
28         "refreshTokensValidFromDateTime": "2016-01-10T12:47:29Z",
29         "companyName": null,
30         "jobTitle": null,
31         "isCompromised": null,
32         "immutableId": null,
33         "otherMails": [
34            "ifat21@hotmail.com"
35         ],
36         "proxyAddresses": [
37            "smtp:john21_hotmail.com#EXT#@avanan.onmicrosoft.com",
38            "SMTP:billsmith@gmail.com"
39         ],
40         "physicalDeliveryOfficeName": null,
41         "sipProxyAddress": null,
42         "telephoneNumber": null,
43         "odata.type": "Microsoft.DirectoryServices.User",
44         "displayName": "john doe",
45         "provisionedPlans": [],
46         "deletionTimestamp": null,
47         "mobile": null,
48         "country": null,
49         "provisioningErrors": [],
```

```
50      "signInNames": [],
51      "dirSyncEnabled": null,
52      "onPremisesSecurityIdentifier": null,
53      "givenName": null
54    }
```

2. API for managing rules
   API reference for management rules
   https://msdn.microsoft.com/ru-ru/library/ff709537(v=exchg.140).aspx Example of rule creation

```
1   <soap:Envelope xmlns:xsi="http://www.w3.org/2001/XMLSchema-instance"
2               xmlns:m="http://schemas.microsoft.com/exchange/services/2006/messages"
3               xmlns:t="http://schemas.microsoft.com/exchange/services/2006/types"
4               xmlns:soap="http://schemas.xmlsoap.org/soap/envelope/">
5       <soap:Header>
6           <t:RequestServerVersion Version="Exchange2013"/>
7           <t:ExchangeImpersonation>
8               <t:ConnectingSID>
9                   <t:PrincipalName>{user_email}</t:PrincipalName>
10              </t:ConnectingSID>
11          </t:ExchangeImpersonation>
12      </soap:Header>
13      <soap:Body>
14          <m:UpdateInboxRules>
15              <m:RemoveOutlookRuleBlob>false</m:RemoveOutlookRuleBlob>
16              <m:Operations>
17                  <t:CreateRuleOperation>
18                      <t:Rule>
19                          <t:DisplayName>{name}</t:DisplayName>
20                          <t:Priority>{priority}</t:Priority>
21                          <t:IsEnabled>true</t:IsEnabled>
22                          <t:Conditions>
23                              <t:ContainsHeaderStrings>
24                                  <t:String>spf=</t:String>
25                              </t:ContainsHeaderStrings>
26                              <t:WithinDateRange>
27                                  <t:StartDateTime>{start_dt}</t:StartDateTime>
```

```
28                                    <t:EndDateTime>{end_dt}</t:EndDateTime>
29                                </t:WithinDateRange>
30                                <t:WithinSizeRange>
31                                    <t:MinimumSize>1</t:MinimumSize>
32                                </t:WithinSizeRange>
33                            </t:Conditions>
34                            <t:Exceptions/>
35                            <t:Actions>
36                                <t:MoveToFolder>
37                                    <t:FolderId Id="{folder_id}"/>
38                                </t:MoveToFolder>
39                            </t:Actions>
40                        </t:Rule>
41                    </t:CreateRuleOperation>
42                </m:Operations>
43            </m:UpdateInboxRules>
44        </soap:Body>
45    </soap:Envelope
46    >
```

Example of rule removal
```
1     <soap:Envelope xmlns:xsi="http://www.w3.org/2001/XMLSchema-instance"
2              xmlns:m="http://schemas.microsoft.com/exchange/services/2006/messages"
3              xmlns:t="http://schemas.microsoft.com/exchange/services/2006/types"
4              xmlns:soap="http://schemas.xmlsoap.org/soap/envelope/">
5         <soap:Header>
6             <t:RequestServerVersion Version="Exchange2013"/>
7             <t:ExchangeImpersonation>
8                 <t:ConnectingSID>
9                     <t:PrincipalName>{user_email}</t:PrincipalName>
10                </t:ConnectingSID>
11            </t:ExchangeImpersonation>
```

```
12          </soap:Header>
13          <soap:Body>
14              <m:UpdateInboxRules>
15                  <m:RemoveOutlookRuleBlob>false</m:RemoveOutlookRuleBlob>
16                  <m:Operations>
17                      <t:DeleteRuleOperation>
18                          <t:RuleId>{rule_id}</t:RuleId>
19                      </t:DeleteRuleOperation>
20                  </m:Operations>
21              </m:UpdateInboxRules>
22          </soap:Body>
23      </soap:Envelope>
```

3. API for creating a folder
   Outlook Mail REST API (1) is used to perform folders creation.
   Request:
       api.user_folder_add(<user_email>, <folder_name>, <parent_folder_id>, <is_hidden>)
   Response:
       status, folder_id
   References:
   (1) https://msdn.microsoft.com/en-us/office/office365/api/mail-rest-operations
   https://msdn.microsoft.com/en-us/office/office365/api/mail-rest-operations#create-folders 4. API for subscribing to web notification
   Outlook Push Notification REST API (1) is used to create a user subscription to receive web notifications
   References:
   (1) https://msdn.microsoft.com/en-us/office/office365/api/notify-rest-operations
   https://msdn.microsoft.com/en-us/office/office365/api/notify-rest-operations#subscribe-to-changes-in-my-mail-calendar-contacts-or-tasks 5. API For downloading a message/attachment
   Outlook Mail REST API (1) is used to download email messages and attachments
   References
   To download email messages:
   (1) https://msdn.microsoft.com/en-us/office/office365/api/mail-rest-operations#get-messages
   To download attachments:
   (1) https://msdn.microsoft.com/en-us/office/office365/api/mail-rest-operations#get-attachments 6. API for moving a message to Inbox (release)
   Outlook Mail REST API (1) is used to move messages in release process.
   References
   (1) https://msdn.microsoft.com/en-us/office/office365/api/mail-rest-operations#move-or-copy-messages 7. API for quarantining a message to Inbox (quarantine)
   Export message
   API Reference:
   https://msdn.microsoft.com/en-us/library/office/aa566013(v=exchg.150).aspx Example of quarantining a message

```xml
1   <?xml version="1.0" encoding="utf-8" ?>
2   <soap:Envelope xmlns:xsi="http://www.w3.org/2001/XMLSchema-instance"
3              xmlns:xsd="http://www.w3.org/2001/XMLSchema"
4              xmlns:soap="http://schemas.xmlsoap.org/soap/envelope/"
5              xmlns:t="http://schemas.microsoft.com/exchange/services/2006/types"
6              xmlns:m="http://schemas.microsoft.com/exchange/services/2006/messages">
7     <soap:Header>
8         <t:RequestServerVersion Version="Exchange2010_SP1"/>
9         <t:ExchangeImpersonation>
10            <t:ConnectingSID>
11                <t:PrincipalName>{user_email}</t:PrincipalName>
12            </t:ConnectingSID>
13        </t:ExchangeImpersonation>
14    </soap:Header>
15    <soap:Body>
16        <m:GetItem>
17            <m:ItemShape>
18                <t:BaseShape>IdOnly</t:BaseShape>
19                <t:IncludeMimeContent>true</t:IncludeMimeContent>
20            </m:ItemShape>
21            <m:ItemIds>
22                <t:ItemId Id="{message_id}"/>
23            </m:ItemIds>
24        </m:GetItem>
25    </soap:Body>
26  </soap:Envelope>
```

8. API for restoring a message to Inbox (restore)
   Import message
   API reference : https://msdn.microsoft.com/ru-ru/library/office/aa566468(v=exchg.150).aspx Example of restoring a message

```xml
<?xml version="1.0" encoding="UTF-8"?>
<soap:Envelope xmlns:xsi="http://www.w3.org/2001/XMLSchema-instance"
   xmlns:xsd="http://www.w3.org/2001/XMLSchema"
   xmlns:soap="http://schemas.xmlsoap.org/soap/envelope/"
   xmlns:t="http://schemas.microsoft.com/exchange/services/2006/types"
   xmlns:m="http://schemas.microsoft.com/exchange/services/2006/messages">
<soap:Header>
    <t:RequestServerVersion Version="Exchange2010_SP1" />
    <t:ExchangeImpersonation>
      <t:ConnectingSID>
        <t:PrincipalName>{user_email}</t:PrincipalName>
      </t:ConnectingSID>
    </t:ExchangeImpersonation>
</soap:Header>
    <soap:Body >
      <m:CreateItem MessageDisposition="SaveOnly">
         <m:SavedItemFolderId>
           <t:FolderId Id="{folder_id}"/>
         </m:SavedItemFolderId>
         <m:Items>
           <t:Message>
             <t:MimeContent CharacterSet="UTF-8">{message}</t:MimeContent>
             <t:ExtendedProperty>
               <t:ExtendedFieldURI PropertyTag="0x0e07" PropertyType="Integer" />
               <t:Value>1</t:Value>
             </t:ExtendedProperty>
```

```
27            </t:Message>
28          </m:Items>
29        </m:CreateItem>
30      </soap:Body>
31  </soap:Envelope>
```

For send notification use user_message_create method of API Request:
api.user_message_create(<user_email>, <data>)
Response:
    status, sent message id
API reference:
https://msdn.microsoft.com/en-us/office/office365/api/mail-rest-operations#create-and-send-messages

GMAIL

1. Creating an API object

```
from googleapiclient.discovery import build
from oauth2client.service_account import ServiceAccountCredentials credentials = ServiceAccountCredentials.from_json_keyfile_name(
     'path_to_json_keyfile',
     scopes=[List of scopes])

http = httplib2.Http()
http = credentials.authorize(http)

api = build('admin', 'directory_v1', http=http)
```

2. API for obtaining user data
   Request:
       api.users().list(<domain>)
   Response:
       status, [users], next_page
   Reference:
   https://developers.google.com/admin-sdk/directory/v1/reference/users/list 3. API for managing rules
   Request:
         api.rule_create(<user_email>, <data>)
   Response:
         status, rule_id
   Reference:
   https://developers.google.com/gmail/api/v1/reference/users/settings/filters 4. API for creating labels
   Request:
         api.labels_create(<user_email>, <user_id>, <data>)
   Response:
         status, label_id
   Reference:
   https://developers.google.com/gmail/api/v1/reference/users/labels/create 5. API for subscribing to notifications
   Request:
         api.watch_email(<user_email>, <domain>)
   Response:
         status
   Reference:
   https://developers.google.com/gmail/api/guides/push 6. API for reading emails from notifications
   Notification for each user contains only history_id.
   Afterwards - get list of the changes for the user with the following API:
   API
   Request:
       api.history_list(<user_email>, <user_id>, <history_id>, <page_token>)
   Response:
       status, [users], next_page
   Reference:
   https://developers.google.com/gmail/api/v1/reference/users/history/list 7. API for downloading attachments
   API
   Request:
       api.attachments_get(<user_email>, <owner_id>, <message_id>, <attachment_id>)
   Response:
       status, data
   Reference:
   https://developers.google.com/gmail/api/v1/reference/users/messages/attachments/get 8. API for changing labels (release)
    API
    Request:
    ```
    api.messages_modify(<user_email>, <user_id>, <message_id>, <changed_labels>)
    Changed labels for "message release" have this form:
    changed_labels = {
    removeLabelIds': [scan_folder_id],
    'addLabelIds': ['INBOX']
    }
    ```
    Response:
    status
    Reference
    https://developers.google.com/gmail/api/v1/reference/users/messages/modify 9. API for quarantine & admin notification

API for get message:
   https://developers.google.com/gmail/api/v1/reference/users/messages/get
   Request:
       api.messages_send(<user_email>, <user_id>, <data>)
   Response:
       Status

API for send message:
   https://developers.google.com/gmail/api/v1/reference/users/messages/send
   Request:
       api.messages_send(<user_email>, <user_id>, <message_id>)
   Response:
       status, data

API for trash message:
   https://developers.google.com/gmail/api/v1/reference/users/messages/trash
   Request:
       api.messages_send(<user_email>, <user_id>, <message_id>)
   Response:
       status

What is claimed is:

1. A data security system, comprising:
    a security manager computer comprising a hardware processor and memory, controlling a cloud-based service, the cloud-based service including an application program that performs data-exchange transactions for end users affiliated with any of one or more enterprises, by generating, via application programming interface (API) calls to the cloud-based service, one or more security platform rules that cause the cloud-based service to automatically move transactions to a quarantine location that is inaccessible or invisible to end users, so as to temporarily prevent transmission of an outgoing transaction sent by an end user affiliated with one of the enterprises to a recipient via the cloud-based service and enable the security manager computer to access the outgoing transaction within the time duration between the outgoing transaction entering the cloud-based service and transmission of the outgoing transaction to the recipient, wherein the security manager does not proxy traffic between end users of the enterprise and the cloud-based service; and
    a data inspector operative to inspect data of the outgoing transaction for data leakage, in accordance with respective data leakage policies for controlling sharing of internal data of the one or more enterprises,
wherein said security manager computer causes the cloud-based service to transmit the outgoing transaction to the recipient in response to said data inspector clearing the data, and in response to said data inspector blocking the data, to perform a remedial action regarding the outgoing transaction, the remedial action being at least one of (i) preventing transmission of the outgoing transaction to the recipient, (ii) replacing data of the outgoing transaction with modified data, (iii) notifying the end user affiliated with one of the enterprises that the outgoing transaction cannot be transmitted to the recipient, (iv) moving the outgoing transaction to a quarantine folder, (v) applying a digital rights management seal to the outgoing transaction, (vi) password encrypting the outgoing transaction, (vii) restricting the outgoing transaction to online-only access, (viii) providing a consent page for accessing the outgoing transaction, (ix) un-sharing the outgoing transaction after lapse of a time period, and (x) alerting an administrator.

2. A method for controlling, by a security processor, a cloud-based service, the cloud-based service including an application program that performs data-exchange transactions for end users affiliated with any of one or more enterprises, the method comprising:
    generating, via application programming interface (API) calls to the cloud-based service, one or more security platform rules that cause the cloud-based service to automatically move transactions to a quarantine location that is inaccessible or invisible to end users, so as to temporarily prevent transmission of an outgoing transaction sent by an end user affiliated with one of the enterprises to a recipient via the cloud-based service, within the time duration between the outgoing transaction entering the cloud-based service and transmission of the outgoing transaction to the recipient, wherein the security manager does not proxy traffic between end users and the cloud-based service;
    inspecting data of the outgoing transaction for data leakage, in accordance with respective data leakage policies for controlling sharing of internal data of the one or more enterprises;
    in response to said inspecting clearing the data, causing, by the security processor, the cloud-based service to transmit the outgoing transaction to the recipient; and
    in response to said inspecting blocking the data, causing, by the security processor, the cloud-based service to perform a remedial action regarding the outgoing transaction, the remedial action being at least one of (i) preventing transmission of the outgoing transaction to the recipient, (ii) replacing data of the outgoing transaction with modified data, (iii) notifying the end user affiliated with one of the enterprises that the transaction cannot be transmitted to the recipient, (iv) moving the outgoing transaction to a quarantine folder, (v) applying a digital rights management seal to the outgoing transaction, (vi) password encrypting the outgoing transaction, (vii) restricting the outgoing transaction to online-only access, (viii) providing a consent page for accessing the outgoing transaction, (ix) un-sharing the outgoing transaction after lapse of a time period, and (x) alerting an administrator.

3. The system of claim 1 wherein said security manager discovers in real-time that a new outgoing transaction has been sent by an end user affiliated with one of the enterprises to a recipient via the cloud-based service.

4. The system of claim 3 wherein the cloud-based service sends an event notification to said security manager when the cloud-based service receives a new outgoing transaction.

5. The system of claim 3 wherein said security manager polls the cloud-based service for receipt of a new outgoing transaction by the cloud-based service.

6. The system of claim 1 wherein said security manager alerts the recipient that the outgoing transaction is undergoing inspection.

7. The system of claim 1 wherein said security manager detects anomalies comprising massive export of data out of any one of the one or more enterprises.

8. The system of claim 1 wherein the recipient is another end user affiliated with one of the enterprises, or an external end user not affiliated with any of the one or more enterprises.

9. The system of claim 1 wherein the outgoing data transaction comprises a document exchange, a file share or an e-mail message.

10. The method of claim 2 further comprising configuring said inspecting so as to be applied to specific users, to specific groups of users, or to an entire enterprise from the one or more enterprises, or so as not to be applied to specific users, to specific groups of users, or to an entire enterprise from the one or more enterprises.

11. The method of claim 2 further comprising configuring said inspecting so as to be applied to specific types of files within outgoing transactions, or so as not to be applied to specific types of files within outgoing transactions.

12. The method of claim 2 further comprising discovering, by the security processor, in real-time that a new outgoing transaction has been sent by an end user affiliated with one of the enterprises to a recipient via the cloud-based service.

13. The method of claim 12 further comprising sending, by the cloud-based service, an event notification to the security processor when the cloud-based service receives a new outgoing transaction.

14. The method of claim 12 further comprising polling, by the security processor, the cloud-based service for receipt of a new outgoing transaction by the cloud-based service.

15. The method of claim 2 further comprising alerting the recipient that the outgoing transaction is undergoing inspection.

16. The method of claim 2 wherein said security manager detects anomalies comprising massive export of data out of any one of the one or more enterprises.

17. The method of claim 2 wherein the recipient is another end user affiliated with one of the enterprises, or an external end user not affiliated with any of the one or more enterprises.

18. The method of claim 2 wherein the outgoing data transaction comprises a document exchange, a file share or an e-mail message.

* * * * *